(12) United States Patent
Devaraj et al.

(10) Patent No.: US 11,563,708 B1
(45) Date of Patent: Jan. 24, 2023

(54) MESSAGE GROUPING

(71) Applicant: Amazon Technologies, Inc., Seattle, WA (US)

(72) Inventors: Christo Frank Devaraj, Seattle, WA (US); Sumedha Arvind Kshirsagar, Seattle, WA (US); Brian Alexander Oliver, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 360 days.

(21) Appl. No.: 15/474,617

(22) Filed: Mar. 30, 2017

(51) Int. Cl.
| | |
|---|---|
| G06F 15/16 | (2006.01) |
| H04L 51/42 | (2022.01) |
| G10L 15/18 | (2013.01) |
| G10L 15/26 | (2006.01) |
| H04L 51/56 | (2022.01) |
| H04L 51/224 | (2022.01) |

(52) U.S. Cl.
CPC .......... *H04L 51/42* (2022.05); *G10L 15/1815* (2013.01); *G10L 15/26* (2013.01); *H04L 51/224* (2022.05); *H04L 51/56* (2022.05)

(58) Field of Classification Search
CPC .............................. H04L 51/22; H04L 51/24
See application file for complete search history.

(56) References Cited

U.S. PATENT DOCUMENTS

| | | | |
|---|---|---|---|
| 2004/0177122 A1* | 9/2004 | Appelman | H04M 3/42042 709/206 |
| 2006/0264209 A1* | 11/2006 | Atkinson | H04L 51/22 455/422.1 |
| 2007/0014417 A1* | 1/2007 | Fujita | H04S 5/005 381/17 |
| 2011/0051661 A1* | 3/2011 | Venkob | H04L 1/1685 370/328 |
| 2012/0124176 A1* | 5/2012 | Curtis | G06Q 50/01 709/219 |
| 2014/0254434 A1* | 9/2014 | Jain | H04W 8/20 370/259 |
| 2014/0270115 A1* | 9/2014 | Burnett | H04M 3/53325 379/88.12 |
| 2016/0055879 A1* | 2/2016 | Arai | H04N 21/4325 386/201 |
| 2016/0364106 A1* | 12/2016 | Koum | G06F 3/0485 |

* cited by examiner

*Primary Examiner* — Hua Fan
(74) *Attorney, Agent, or Firm* — Lee & Hayes, P.C.

(57) ABSTRACT

Systems and methods to combine related messages are disclosed. Multiple messages may be combined into a single message for display and output on one or more devices based on one or more factors. The factors may include, for example, a determination that the multiple messages were sent by and/or received from the same device, user, user profile, and/or user account. The facts may also include a determination that the multiple messages were sent within a threshold amount of time of each other and/or that the messages have the same or similar themes.

17 Claims, 8 Drawing Sheets

MESSAGE GROUPING

BACKGROUND

A device can send messages to another device and a remote system can facilitate the sending of such messages. The sent messages are directed to accounts or profiles associated with recipient devices. Messages are displayed as individual messages on the recipient devices in the order that they were received.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
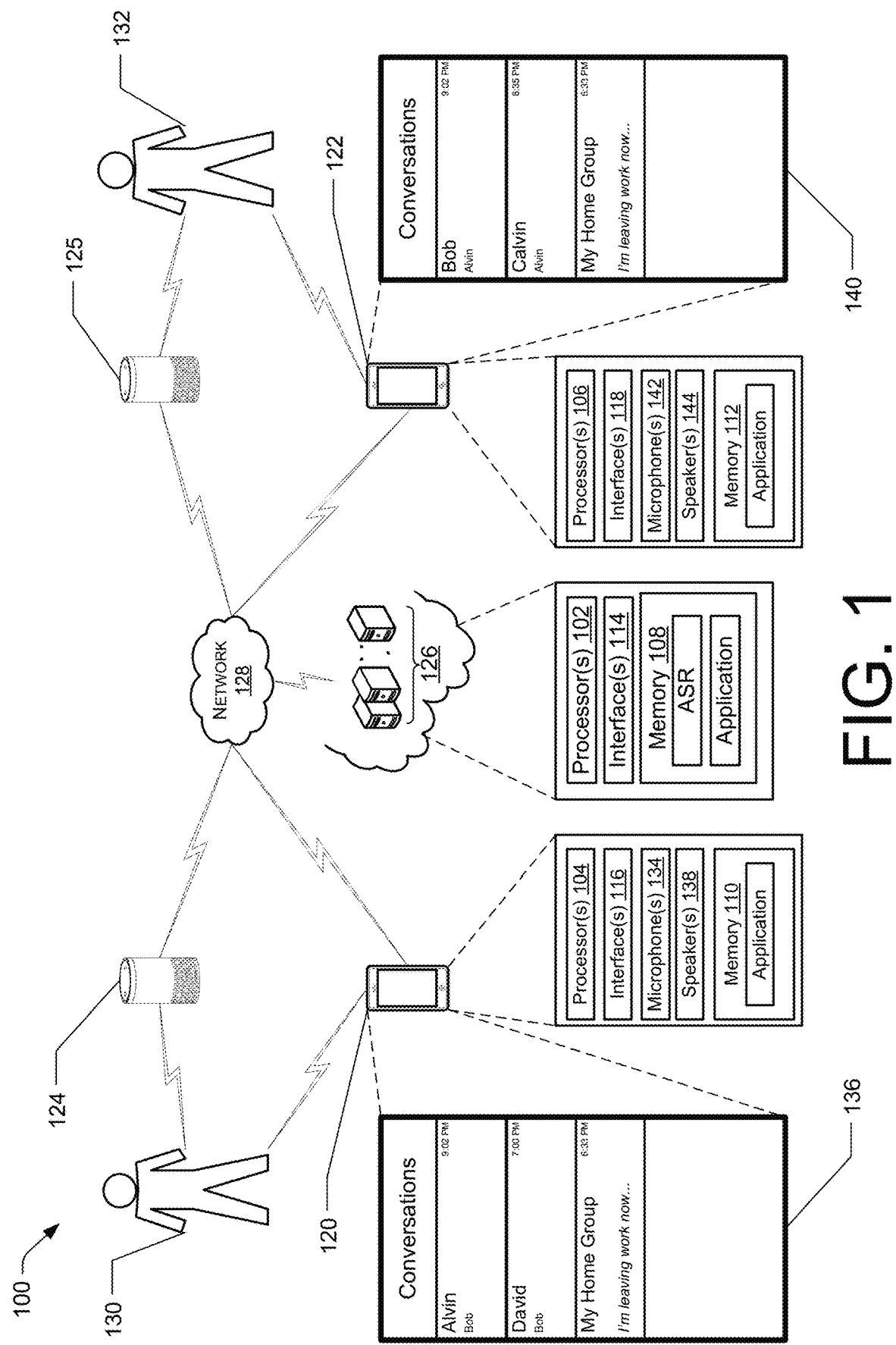
FIG. 1 illustrates a schematic diagram of an example system for message grouping.

Systems and methods for grouping messages are described herein. Communication means have expanded with the advent of mobile devices and voice-assistant devices. Not only can individuals use these devices to send audio, video, and textual messages back and forth to each other's devices, but users may also desire to send and/or receive grouped messages instead of sending and/or receiving multiple separate messages. The systems and methods described herein provide a user experience where messages sent by the same user and/or sent within a certain amount of time of each other and/or that have the same or a similar theme are grouped together and displayed and/or output as a single message. By so doing, the present systems and methods allow users to more intuitively view and/or hear messages without viewing and/or hearing individual messages.

For example, envision two users, Alvin and Bob, that are sending messages to each other. Bob may send Alvin two messages from Bob's mobile device and/or from a voice-assistant device. Based at least in part on the two messages being sent from Bob's device, the two messages may be associated with each other such that, when sent to Alvin, the two messages are displayed as a single message on, for example, Alvin's mobile device. Likewise, the two messages may be output as a single message from a voice-assistant device associated with Alvin.

Associating the two messages with each other may additionally, or alternatively, be based at least in part on the two messages being sent and/or received within a certain amount of time from each other. For example, expanding on the example provided above, Bob may send a first message of the two messages at 7:00 pm. Bob may then send a second message of the two messages at 7:02 pm. Given that the two messages were sent within two minutes of each other, the two messages may be associated as a single message. Determining whether to associate the two messages based on their send and/or receive times may be based on whether the two messages were sent within a threshold amount of time from each other, such as, for example, 10 minutes. In examples where at least one message is sent from a voice-assistant device, the voice-assistant device may have a maximum length for a message, but the user may desire to send a message that is longer than the maximum length. In these examples, the systems may determine that the length of a message corresponds to the maximum message length, and the systems may associate the message with a subsequent message based at least in part on that determination.

Additionally, or alternatively, associating the two messages with each other be based at least in part on the two messages having the same or a similar theme. The theme may be determined from text data corresponding to the two messages. The text data of the two messages may include similar keywords and/or similar subject matter as determined using natural language understanding techniques described more fully below. For example, the two messages from Bob may be "Let's get pizza for lunch" and "Is pepperoni okay with you?" In this example, the systems described herein may determine that a theme of the first message is "pizza." The systems may also determine that a theme of the second message is also "pizza," even though the word "pizza" is not present in the second message, based at least in part on natural language understanding techniques that identify the word "pepperoni" as a word that is commonly associated with "pizza," for example.

The associated messages may then be displayed and/or output as a single message. Expanding on the example above, the two messages sent from Bob to Alvin may be displayed on a user interface of Alvin's mobile device. The two messages may be displayed together as one message. The two messages may additionally, or alternatively, be output together by, for example, Alvin's voice-assistant device. In this example, Alvin may provide a command to the voice-assistant device to play Alvin's messages. The voice-assistant device may output, via one or more speakers of the voice-assistant device, the two messages received from Bob as a single message. For example, instead of the voice-assistant device outputting "You have two messages from Bob. Message one: Let's get pizza for lunch. Message two: Is pepperoni okay with you?" the voice-assistant device may output the following, for example: "You have one message from Bob. Let's get pizza for lunch. Is pepperoni okay with you?"

The application and/or the remote system described herein may provide a range of additional, or alternative, functionalities to users. These functionalities may include generating text data representing a transcription of audio message data and sending the text data and/or audio message data to one or more devices. The functionalities may also include generating audio data from textual message data and sending the audio data and/or the textual message data to one or more devices. For example, synthesized speech and/or prerecorded speech of a voice talent and/or a user may be used to generate audio data corresponding to a message that includes text data. The functionalities may also include partially combining messages as described above. For example, when a second message is sent after a first threshold amount of time has passed since sending of a first message, but the second message is sent within a second threshold amount of time, the two messages may be combined into a single message and audio data and/or text data may be generated and utilized in the single message to indicate to a user that the two messages are related but that they were sent at different times. For example, the audio data may be an audio earmark that includes synthesized and/or prerecorded speech of a word or phrase that audibly indicates that one message was sent after another message. In other examples, such as when at least one of the first message or the second message comprises text data, the earmark may include text data such as a word or phrase that visually indicates that one message was sent after another message. The audio and/or text data may provide an audible, and/or textual indicator, such as the word "then," for example, between display and/or output of the first message and the second message.

The additional functionalities may also include normalizing one or more aspects of messages combined into a single message. For example, when the messages include audio data, the audio data from one message may be at a higher or lower volume than other messages. The volumes, and/or other characteristics of the audio data, such as pitch, tone, etc., may be normalized such that, when audio corresponding to the audio data is output, the messages have the same or similar sound characteristics. The additional functionalities may also include combining message data of differing media types, such as, for example, text data, audio data, image data, etc. For example, first message data may include image, which may include image data, and second message data may include audio data and/or text data. Based at least in part on at least one of the factors for combining message data as described herein, the first message data and the second message data may be combined such that, for example, the text data is displayed along with the image data, and/or the audio data is output while the image data is displayed. Additionally, the functionalities may include consolidating and/or removing communication notifications based on the factors for combining messages as described herein. For example, first message data may include a missed call notification and second message data may include text data and/or audio data sent from the same device and/or user profile and/or user account that the missed call was sent from. The first message data and the second message data may be combined and the missed call notification may be removed and/or not sent to the receiving device.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example system 100 for message grouping. System 100 may include one or more processors. As used herein, a processor, such as processor(s) 102, 104, and/or 106, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 102, 104, and/or 106 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 102, 104, and/or 106 may possess its own local memory, which also may store program components, program data, and/or one or more operating systems.

System 100 may also include memory 108, 110, and/or 112. Memory 108, memory 110, and memory 112 may include volatile and nonvolatile memory, removable and non-removable media implemented in any method or technology for storage of information, such as computer-readable instructions, data structures, program component, or other data. Such memory 108, 110, and/or 112 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 108, 110, and/or 112 may be implemented as computer-readable storage media ("CRSM"), which may be any available physical media accessible by the processor(s) 102, 104, and/or 106 to execute instructions stored on the memory 108, 110, and/or 112. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 108, 110, and/or 112, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Wash., USA; the Windows operating system from Microsoft Corporation of Redmond, Wash., USA; LynxOS as promulgated by Lynx Software Technologies, Inc. of San Jose, Calif.; Operating System Embedded (Enea OSE) as promulgated by ENEA AB of Sweden; and so forth.

Each of the network interface(s) 114, network interface(s) 116, and network interface(s) 118 may enable communications between a first device 120, a second device 122, a third device 124, a fourth device 125, and a remote system 126, as well as other networked devices. Such network interface(s) can include one or more network interface controllers (NICs) or other types of transceiver devices to send and receive communications over a network.

For instance, each of the network interface(s) 114, network interface(s) 116, and network interface(s) 118 may include a personal area network (PAN) component to enable communications over one or more short-range wireless communication channels. For instance, the PAN component may enable communications compliant with at least one of the following standards IEEE 802.15.4 (ZigBee), IEEE 802.15.1 (Bluetooth), IEEE 802.11 (WiFi), or any other PAN communication protocol. Furthermore, each of the network interface(s) 114, network interface(s) 116, and network interface(s) 118 may include a wide area network (WAN) component to enable communication over a wide area network. The network 128 may represent an array of wired networks, wireless networks, such as WiFi, or combinations thereof.

In some instances, the remote system 126 may be local to an environment associated the first device 120, the second device 122, the third device 124, and/or the fourth device 125. For instance, the remote system 126 can be located within the third device 124 and/or the fourth device 125. In some instances, some or all of the functionality of the remote system 126 may be performed by one or more of the first device 120, the second device 122, the third device 124, or the fourth device 125.

In some instances, the remote system 126 is configured to receive first message data, which may correspond to a first message. In examples, the first message data may comprise one or more of text data, audio data, and/or image data. The first message data may be received from, for example, the first device 120. The remote system 126 may be further configured to receive second message data, which may correspond to a second message. The remote system 126 may be further configured to determine whether the first message data and the second message data should be associated such that the first message data and the second message data are displayed and/or output as a single message. The single message may be displayed on, for example, the user interface 136 of the first device 120. Additionally, when messages and/or message data are described as being sent to and/or from a user, it should be appreciated that the messages and/or message data may be sent to one or more user profiles associated with a user and/or one or more user accounts associated with a user. A user may be associated with more than one account, and each account may be associated with multiple profiles. The user profiles and/or user accounts may be associated with devices of the user, such as, for example, phones, computers, tablets, and/or personal assistants. Additionally, or alternatively, the user profiles and/or user accounts may be associated with one or more applications, which may be stored on user devices and/or on a remote system.

The determination to associate the first message data and the second message data may be based at least in part on one or more factors. The factors may include, for example, a determination that the first message data and the second message data were sent from the same device and/or from the same user profile and/or from the same user account. For example, the first message data and the second message data may be sent from the first device 120. Alternatively, the first message may be sent from the first device 120 and the second message may be sent from the third device 124, with both messages being sent from the same user profile and/or same user account associated with the first device 120 and the third device 124.

The factors may additionally, or alternatively, include a determination that the second message data was sent and/or received within a threshold amount of time from when the first message data was sent and/or received. In examples, timing data may be included in the message data that is sent from, for example, the first device 120 and/or the second device 122. The timing data may indicate a time of day and/or a date that the messages were sent. The timing data may be received by the remote system 126, which may utilize the timing data to determining whether messages were sent within the threshold amount of time. In some examples, the message data from at least one of the messages may be encrypted and may be inaccessible to the remote system 126. In these examples, when the content data of the messages is encrypted but the timing data is not encrypted, the timing data may be used to determine whether the messages were sent within the threshold amount of time. When the timing data is also encrypted, the remote system 126 may determine a time of day and/or a date that the encrypted message was received at the remote system 126 and may use that data to determine when messages are sent and/or received within the threshold amount of time from each other. The threshold amount of time may be static or dynamic. For example, when the threshold amount of time is static, the threshold amount of time may be predefined by, for example, the remote system 126 or a user-configurable setting. The threshold amount of time may be, for example, a number of seconds, a number of minutes, and/or a number of hours. In other examples where the threshold amount of time is dynamic, the threshold amount of time may differ with respect to the sending and/or receiving device, the sending and/or receiving user profile, the sending and/or receiving user account, and/or historical sending and/or receiving activity. For example, the remote system 126 may determine that related messages from a first user are sent relatively close in time to each other, such as a matter of seconds. In this example, the threshold amount of time with respect to the first user may be a matter of seconds, such as, for example 15 seconds or 30 seconds. In other examples, the remote system 126 may determine that a time difference between sending of related messages from a second user is greater than that of the first user, such as, a matter of minutes. In this example, the threshold amount of time with respect to the second user may be a matter of minutes, such as, for example 1 minute, 2 minutes, 5 minutes, 10, minutes, 15 minutes, or 30 minutes. As message sending and/or receiving behavior changes over time, the threshold amount of time may also change proportionally.

The factors may also include a determination that the first message data and the second message data have the same or a similar theme. Determining the theme of messages may include, for example, utilizing text data of the message data along with natural language understanding techniques. In examples where the message data includes audio data, the remote system 126 may generate text data representing a transcription of the audio data utilizing automatic speech recognition techniques, as described more fully below. The text data may then be analyzed utilizing natural language understanding techniques, described more fully below, to determine one or more themes associated with a given message. In examples, data may be generated that associates the one or more themes that are detected with the message that the themes were detected from. In these examples, the theme data and/or the content data of the message may be encrypted such that unwanted and/or unauthorized access to the theme data and/or the content data is restricted or prevented. The encrypted data may be sent from the remote system to the sending and/or receiving device and the encrypted data, once received at the sending and/or receiving device may be unencrypted so that it may be displayed and/or output. Messages may be associated with each other into a single message when at least one theme of each message is the same or similar. In examples where no matching theme is present, a determination of whether similar themes are present across messages may be made. Determining whether themes across messages are similar may also be performed using the natural language understand techniques described more fully below.

The factors may also be based at least in part on social relationships between message senders and recipients. For example, one or more social graphs that express relationships between senders and recipients may be used to determine if two or more messages should be associated with each other. The one or more social graphs may utilize relationship-related information accessed through social media platforms and/or as input by users, for example, and the remote system 126 may utilize this information to determine if two or more messages should be associated.

The remote system 126 may be further configured to cause the first message data to be associated with the second message data as a single message based at least in part on the one or more factors described herein. Causing the first message data to be associated with the second message data may be performed in a number of ways. For example, the first message data may correspond to a first file and the second message data may correspond to a second file. The first message data may be added to the second file or the second message data may be added to the first file, such that the first message data and the second message data are combined into a single file. In these examples, the other file may be deleted. In other examples, a third file may be generated and the first message data and second message data may be added to the third file. In these examples, the first file and the second file may be deleted. In other examples, one or more instructions may be generated and associated with the first file and second file. The one or more instructions may be sent with the first file and the second file, and the one or more instructions may instruct processors situated on recipient devices to display and/or output the first message data and the second message data together as one message. Combining message data as described herein may be otherwise described as stitching, merging, and/or linking message data.

Causing the first message data to be associated with the second message data, as described herein, may also be performed based on one or more confidence levels. If, given the one or more factors for combining message data described above, there is a high confidence level that the first message data and the second message data are related, then the message data may be combined without further input or processing. For example, when first message data is sent from the same device as second message data, and the two messages are sent within a threshold amount of time, a high confidence that the messages should be combined may exist. A determination that the first and second message data also includes at least one similar theme may further increase the confidence level. In other examples, where the first and second message data is not sent from the same device, user profile, and/or account, are not sent within a threshold amount of time, but do have one or more similar themes, the confidence level may be lower. In instances where the confidence level falls below a threshold level of confidence, a notification and/or indication may be presented and/or output to the sender and/or recipient. In some examples, a notification that the message will be combined may be presented and/or output to the sender. The sender may provide an indication affirming the combination or rejecting the combination. Additionally, or alternatively, the notification may be presented and/or output to the recipient such that the recipient is notified that the messages have been combined. Indications provided by senders and/or recipients in response to the notification may be utilized to improve the determination of whether message data should be combined for future messages.

The remote system 126 may be further configured to receive, from a recipient device such as the second device 122 and/or the fourth device 125, a request to output message data associated with the recipient device, and/or one or more user profiles associated with the recipient device, and/or one or more user accounts associated with the recipient device. The request may be made by, for example, a user 132. The request may be received from the second device 122 and/or the fourth device 125 by way of data indicating that a request from the user 132 has been made. The request from the user 132 may be, for example, a command to retrieve messages associated with the device, the user profile, and/or the user account. The command may be a selection made by the user 132 on a mobile device, such as the second device 122. The command may additionally, or alternatively, be an audio command to retrieve messages made to a mobile device, such as the second device 122, and/or a voice-assistant device, such as the fourth device 125.

The remote system 126 may be configured to send messages associated with the recipient device, user profile, and/or user account to one or more devices associated with the recipient, such as user 132. In some examples, when the one or more recipient devices includes a display, the messages may be displayed on the display. Message data that has been combined as described herein may be displayed as a single message, as described more fully below. In some examples, when the one or more recipient devices includes one or more microphones, audio corresponding to the message data may be output by the one or more microphones. Message data that has been combined as described herein may be output as a single message, as described more fully below.

Additional messages may be received and sent between the first device 120, the second device 122, the third device 124, the fourth device 125, and one or more other devices associated with the first user 130 and/or the second user 132. These additional messages may be grouped with previously sent messages based at least in part on the factors described herein.

Additionally, or alternatively, the memory 110 on the first device 120 may, when executed by the processor(s) 104, cause the processor(s) 104 to perform operations similar to those described above with respect to the remote system 126. For example, the first device 120 may be configured to receive first message data, which may correspond to a first message. In examples, the first message data may comprise one or more of text data, audio data, and/or image data. The first message data may be received from, for example, the second device 122. The first device 120 may be further configured to receive second message data, which may correspond to a second message. The first device 120 may be further configured to determine whether the first message data and the second message data should be associated such that the first message data and the second message data are displayed and/or output as a single message. The determination to associate the first message data and the second message data may be based at least in part on the one or more factors described above.

The first device 120 may be further configured to cause the first message data to be associated with the second message data as a single message based at least in part on the one or more factors described herein. Causing the first message data to be associated with the second message data may be performed in a number of ways. For example, the first message data may correspond to a first file and the second message data may correspond to a second file. The first message data may be added to the second file or the second message data may be added to the first file, such that the first message data and the second message data are combined into a single file. In these examples, the other file may be deleted. In other examples, a third file may be generated and the first message data and second message data may be added to the third file. In these examples, the first file and the second file may be deleted. In other examples, one or more instructions may be generated and associated with the first file and second file. The one or more instructions may be sent with the first file and the second file, and the one or more instructions may instruct processors situated on recipient devices to display and/or output the first message data and the second message data together as one message. Combining message data as described herein may be otherwise described as stitching, merging, and/or linking message data.

The first device 120 may be configured to receive a request to output message data associated with the first device 120, and/or one or more user profiles associated with the first device 120, and/or one or more user accounts associated with the first device 120. The request may be made by, for example, user 130. The request may be received from the one or more microphones 134 associated with the first device, from a display associated with the first device 120, and/or from data received from the third device 124. The request from the user may be, for example, a command to retrieve messages associated with the first device 120, the user profile, and/or the user account.

The first device 120 may be configured to display the message data on the display. Message data that has been combined as described herein may be displayed as a single message, as described more fully below. The first device 120 may be further configured to output audio corresponding to the message data by the one or more microphones 134 of the first device 120 and/or one or more microphones associated with the third device 124. Message data that has been combined as described herein may be output as a single message, by, for example, one or more speakers 138 of the first device 120, as described more fully below.

While reference has been made to the first device 120 performing operations similar to those performed by the remote system 126, it should be understood that these operations may additionally, or alternatively, be performed by the second device 122, the third second 124, and/or the fourth device 125. Additionally, some of the operations described herein may be performed by one of the devices in system 100, while other operations may be performed by another and/or other devices in system 100. For example, capturing of audio and generation of audio data may be performed by one or more microphones 142 of the second device 122, and output of audio corresponding to audio data may be performed by one or more speakers 144 of the second device 122. Display of message data may be performed using the user interface 140 of device 122.

Figure 2:
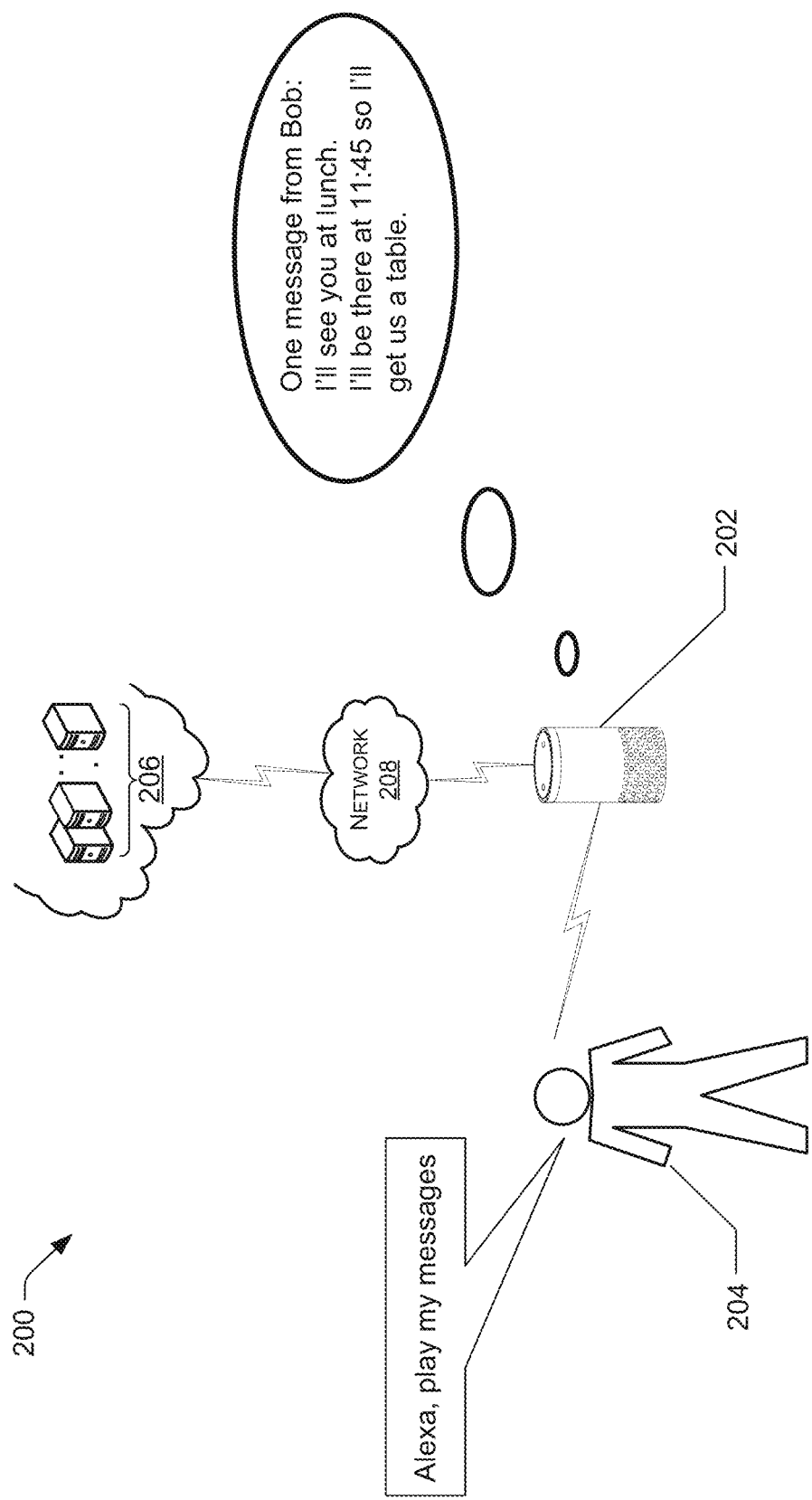
FIG. 2 illustrates a schematic diagram depicting output of grouped messages.

FIG. 2 illustrates a schematic diagram of an example system 200 for output of grouped messages. System 200 may include a device 202, which may be a voice-assistant device. A user 204 may interact with the device 202 by, for example, providing audible commands to the device 202. The one or more microphones of the device 202 may capture audio from the user 204 and may generate audio data corresponding to the audio. The device 202 may send and receive information from a remote server 206 via network 208. The remote server 206 may include components similar to those discussed above with respect to the remote server 126 from FIG. 1.

The device 202 may send the audio data generated by the one or more microphones to the remote server 206 via the network 208. The remote server 206 may perform automatic speech recognition on the audio data to generate text data representing a transcription of the audio data. One or more intents may be determined from the text data using, for example, natural language understanding techniques. Automatic speech recognition techniques and natural language understanding techniques, as used herein, are described more fully below with respect to FIG. 8. For example, as shown in FIG. 2, the user 204 says "Alexa, play my messages." The one or more microphones of the device 202 may capture this audio and generate audio data corresponding to the audio. That audio data may be sent to the remote server 206, which may perform automatic speech recognition on the audio data to generate text data that includes the words "Alexa, play my messages." Natural language understanding techniques may be utilized to determine that an intent of the user is for the device 202 to output, via one or more speakers of the device 202, any messages sent to the device 202, and/or a user profile associated with the device 202, and/or a user account associated with the device 202. Alternatively, the device 202, may perform the automatic speech recognition and natural language understanding described herein.

Based at least in part on the remote server 206 determining that an intent of the user 204 is for the device 202 to output messages as described herein, the remote server 206 may send messages, if any, to the device 202. The remote server 206 may cause the one or more speakers of the device 202 to output the messages that have been sent to the device 202, and in some instances, may also cause the device 202 to output supplemental information associated with the messages. The supplemental information may include a name or other identifying information associated with the sender, sending device, sender profile, and/or sender account. The supplemental information may additionally, or alternatively, include a time of day and/or a day of the week or the month that a message was sent and/or received. In examples, messages that have been combined may be output in an overlapping fashion, instead of one-by-one, in chronological order. For example, multiple senders may send the message "Happy Birthday" to a recipient. These messages may be combined into a single message based on, for example, the common theme of "birthday." Instead of each message being output, such as via one or more speakers of the device 202, the messages may be overlapped and output at or near the same time, which may create the impression of a group of people speaking all at once.

The remote server 206 may also combine one or more messages sent to device 202 using the message combination techniques described herein. For example, as shown in FIG. 2, two messages have been sent to the device 202, and/or the user 204, and/or a user profile or account associated with the device 202 or the user 204. Those messages, for purposes of illustration, are (1) I'll see you at lunch; and (2) I'll be there at 11:45 so I'll get us a table. The remote server 206 may cause these two messages to be associated with each other as a single message based on one or more factors. The factors may include, for example, a determination that the messages were sent from the same device and/or from the same user profile and/or from the same user account. For example, the two messages depicted in FIG. 2 are sent from a user profile and/or user account associated with "Bob." The two messages may have been sent from the same device associated with Bob, such as, for example, a mobile device or a voice-assistant device. Alternatively, the two messages may have been sent from more than one device associated with Bob, such as, for example, a mobile device and a voice-assistant device.

The factors may additionally, or alternatively, include a determination that the messages were sent and/or received within a threshold amount of time from each other. The threshold amount of time may be static or dynamic. For example, when the threshold amount of time is static, the threshold amount of time may be predefined by, for example, the remote system 206 or a user-configurable setting. The threshold amount of time may be, for example, a number of seconds, a number of minutes, and/or a number of hours. In other examples where the threshold amount of time is dynamic, the threshold amount of time may differ with respect to the sending and/or receiving device, the sending and/or receiving user profile, the sending and/or receiving user account, and/or historical sending and/or receiving activity. For example, the remote system 206 may determine that related messages from a first user are sent relatively close in time to each other, such as a matter of seconds. In this example, the threshold amount of time with respect to the first user may be a matter of seconds, such as, for example 15 seconds or 30 seconds. In other examples, the remote system 206 may determine that a time difference between sending of related messages from a second user is greater than that of the first user, such as, a matter of minutes. In this example, the threshold amount of time with respect to the second user may be a matter of minutes, such as, for example 1 minute, 2 minutes, 5 minutes, 10, minutes, 15 minutes, or 30 minutes. As message sending and/or receiving behavior changes over time, the threshold amount of time may also change proportionally.

The factors may also include a determination that the messages have the same or a similar theme. Determining the theme of messages may include, for example, utilizing text data of the message along with natural language understanding techniques. In examples where the message includes audio data, the remote system 206 may generate text data representing a transcription of the audio data utilizing automatic speech recognition techniques, as described more fully below. The text data may then be analyzed utilizing natural language understanding techniques, described more fully below, to determine one or more themes associated with a given message. Messages may be associated with each other into a single message when at least one theme of each message is the same or similar. In examples where no matching theme is present, a determination of whether similar themes are present across messages may be made. Determining whether themes across messages are similar may also be performed using the natural language understand techniques described more fully below.

Causing messages to be associated with each other may be performed in a number of ways. For example, first message data may correspond to a first file and second message data may correspond to a second file. The first message data may be added to the second file or the second message data may be added to the first file, such that the first message data and the second message data are combined into a single file. In these examples, the other file may be deleted. In other examples, a third file may be generated and the first message data and second message data may be added to the third file. In these examples, the first file and the second file may be deleted. In other examples, one or more instructions may be generated and associated with the first file and second file. The one or more instructions may be sent with the first file and the second file, and the one or more instructions may instruct processors situated on recipient devices to display and/or output the first message data and the second message data together as one message. Combining message data as described herein may be otherwise described as stitching, merging, and/or linking message data.

Figure 3:
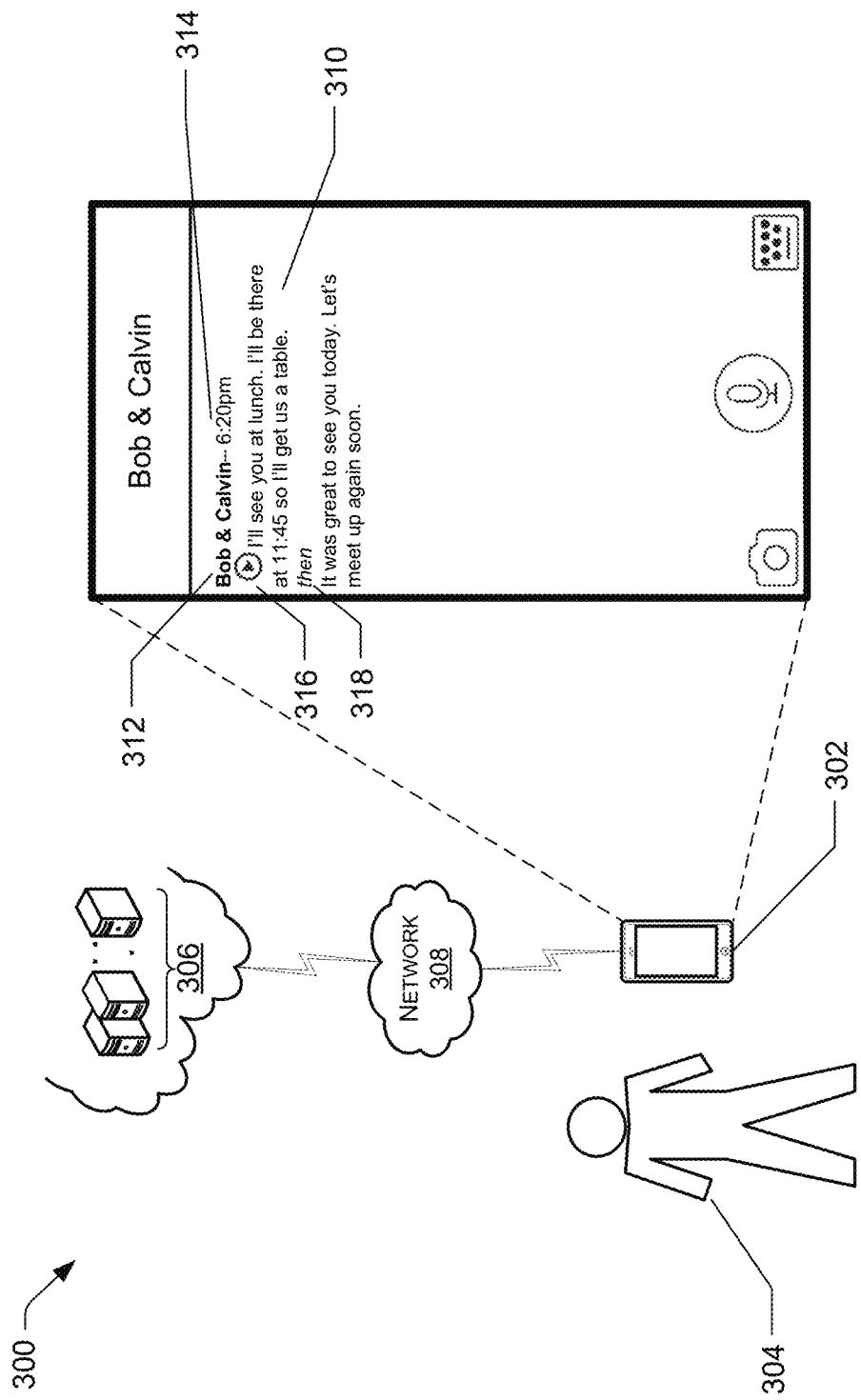
FIG. 3 illustrates a schematic diagram depicting display of grouped messages.

FIG. 3 illustrates a schematic diagram depicting an example system 300 for display and/or output of grouped messages. System 300 may include a device 302, which may be, for example, a mobile device that includes one or more microphones, one or more speakers, and a display. A user 304 may interact with the device 302 by, for example, providing audible commands to the device 302. The one or more microphones of the device 302 may capture audio from the user 304 and may generate audio data corresponding to the audio. The device 302 may send and receiving information from a remote server 306 via network 308. The remote server 306 may include components similar to those discussed above with respect to the remote server 126 from FIG. 1.

The device 302 may send the audio data generated by the one or more microphones to the remote server 306 via the network 308. The remote server 306 may perform automatic speech recognition on the audio data to generate text data representing a transcription of the audio data. One or more intents may be determined from the text data using, for example, natural language understanding techniques. Automatic speech recognition techniques and natural language understanding techniques are described more fully below with respect to FIG. 8. For example, the remote system 306 may determine that an intent of the user is for the device 302 to display and/or output, via one or more speakers of the device 302, any messages sent to the device 302, and/or a user profile associated with the device 302, and/or a user account associated with the device 302.

Based at least in part on the remote server 306 determining that an intent of the user is for the device 302 to display and/or output messages as described herein, the remote server 306 may send messages, if any, to the device 302. The remote server 306 may cause the one or more speakers of the device 302 to output audio corresponding to the message data that has been sent to the device 302, and in some instances, may also cause the device 302 to output supplemental information associated with the message data. The supplemental information may include a name or other identifying information associated with the sender, sending device, sender profile, and/or sender account. The supplemental information may additionally, or alternatively, include a time of day and/or a day of the week or the month that a message was sent and/or received. Additionally, or alternatively, the remote server 306 may cause the display of device 302 to display text data corresponding to the messages.

The user command may alternatively be a selection made by the user 304. The selection may be made, for example, by the user 304 touching a portion of the display of the device 302 associated with at least a portion of message data sent to the device 302. Additionally, or alternatively, one or more symbols and/or notifications may be displayed on the device 302. The user may select the messages for display by touching a portion of the display associated with the one or more symbols and/or notifications.

In some examples, message data displayed on device 302 may include combined message data comprising two or more messages that have been combined based on the factors described herein. For example, the message data may be combined based at least in part on the two or more messages being sent from the same device, the same user profile, and/or the same user account. Additionally, or alternatively, the message data may be combined based at least in part on the two or more messages being sent within a threshold amount of time from each other. In other examples, as shown in FIG. 3, the message data may be combined based one or more similar themes associated with the messages. In this example, the message data may be combined even if the two or more messages are sent from different devices, user profiles, and/or user accounts. For example, as depicted in FIG. 3, a first message may be "I'll see you at lunch. I'll be there at 11:45 so I'll get us a table," and a second message may be "It was great to see you today. Let's meet us again soon." In this example, the first message may be sent from one device, user profile, and/or user account associated with "Bob," while the second message may be sent from another device, user profile, and/or user account associated with "Calvin." Even though the messages are sent from different device, user profiles, and/or user accounts, a common theme may be present as between the two messages that indicates that the messages are relevant and should be combined for display and/or output to the recipient.

Display of the combined message data, such as message data 310, may include a name indicator 312 and/or a time of day 314 that at least one message of the combined message data was sent and/or received. In some examples, the time of day 314 may be the time that the first message data in the combined message data was received by the device 302.

In instances where the combined message data at least partially includes audio data, which may correspond to an audio message sent to device 302, a play icon 316 may be displayed along with the combined message data. Selection of the play icon 316 by the user 304 may cause the one or more speakers of the device 302 to output audio corresponding to the audio data. In these examples, the text data displayed on the device 302 may represent a transcription of the audio data.

In instances where the combined message data includes audio data and text data, the remote system 306 may generate audio data that corresponds to the text data. The generated audio data may include a synthesized voice and/or a prerecorded voice, such as from a voice talent.

In addition to text data corresponding to the combined message, an earmark 318 may also be displayed. The earmark 318 may be displayed when, for example, second message data of the combined message was sent and/or received after a first threshold amount of time has passed and within a second threshold amount of time. By so doing, the earmark 318 may provide the user 304 with an indication that the combined message includes two separate messages that, while related, were sent at different times. For example, the earmark 318 may be a textual earmark 318, such as the word "then," displayed between text data representing the first message data and text data representing the second message data. The textual earmark 318 may provide the user 304 with an indication that the first message data was sent and then the second message data was sent at a later time. In examples where at least a portion of the combined message data includes audio data, the earmark 318 may additionally, or alternatively, be an audio earmark 318, which may cause the one or more speakers of the device 302 to output audio between audio of the first message data and audio of the second message data to provide an audible indication that the two messages, while related, were sent at different times.

The grouping of message data as described herein may include combining some components of the message data while removing and/or not combining other components. For example, message data may include components such as header data, time sent and/or received data, content data, and attachment data. When two messages are combined as described herein, the content data from each of the two messages may be combined. Additionally, attachment data, if any, of one message may also be combined with the attachment data of the other message. The content data and/or the attachment data may be combined such that, when displayed on a sending and/or recipient device, the content data and/or the attachment data of the two messages appear as one message. The header data may include data identifying the sending and/or recipient user, user profile, and/or user account. When messages are combined as described herein, the header data of one of the two messages may be removed and/or deleted. For example, when two messages are combined because they are sent from the same sender and within a threshold amount of time from each other, each of the two messages may include header data that indicates that the messages were sent from a particular sender. When the two messages are combined, the header data from the second message, for example, may be removed such that only the header data from the first message is displayed. The same or a similar process may be utilized for the time sent and/or received data.

Additionally, or alternatively, the remote system 306 and/or the device 302 may determine that two or more messages, in addition to being combined, should be displayed in an order that differs from when those messages were sent and/or received. For example, when multiple messages are sent and/or received within a short period of time, a delay in receiving and/or displaying those messages may occur, and/or the sender may send multiple messages in one order but desire to change that order to ensure the meaning of the messages is clear. In these examples, the remote system 306 and/or the device 302 may rearrange the messages that have been combined. The remote system 306 and/or the device 302 may determine, using natural language understanding techniques described more fully with respect to FIG. 8 below, that the messages were received out of order and/or that the content of the messages would be more understandable if rearranged from the order in which those messages were received. In addition, or alternatively, a sender may desire, after sending two or more messages, to rearrange the order of the messages. The sender may provide an indication to a device sending the messages that the messages should be rearranged. The remote system 306 and/or the device 302 may rearrange the messages based at least in part on the indication.

Figure 4B:
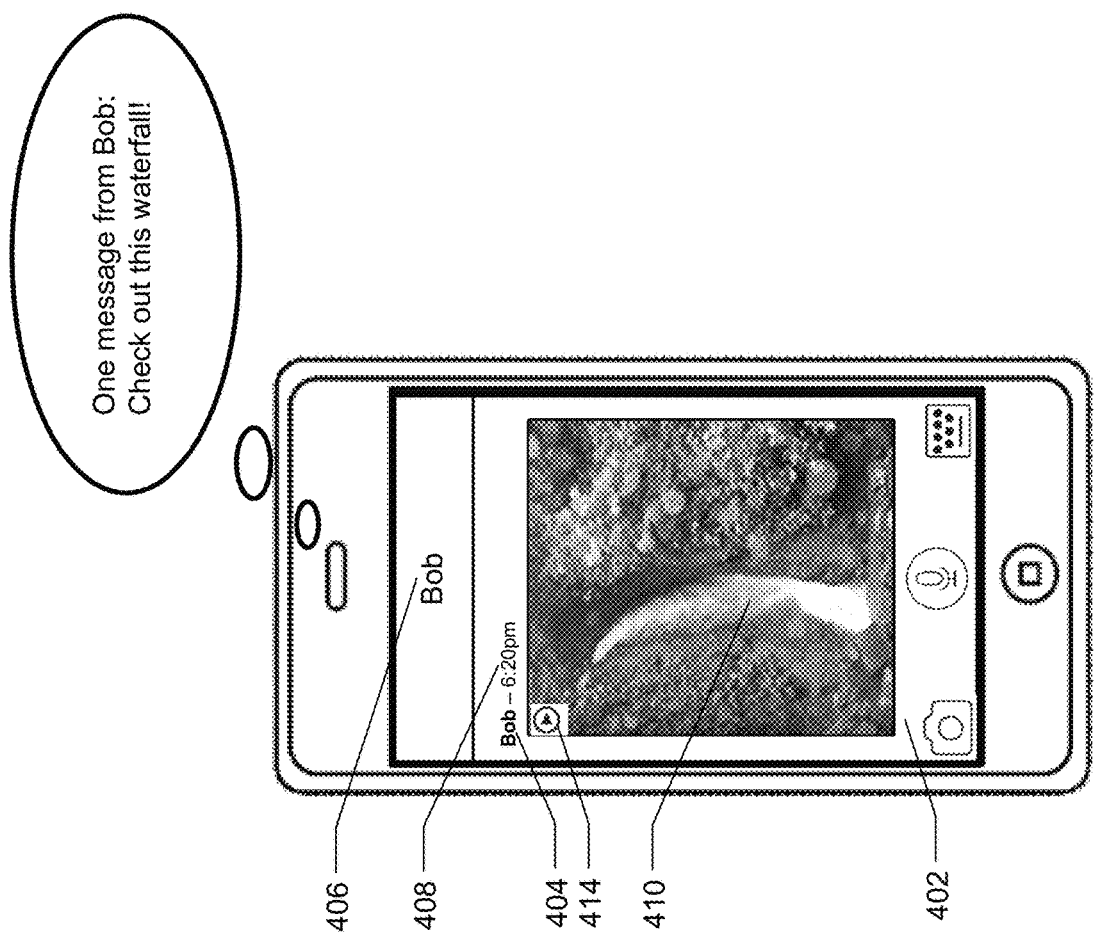
FIG. 4B illustrates an example user interface depicting image message data grouped with audio message data.
Figure 4A:
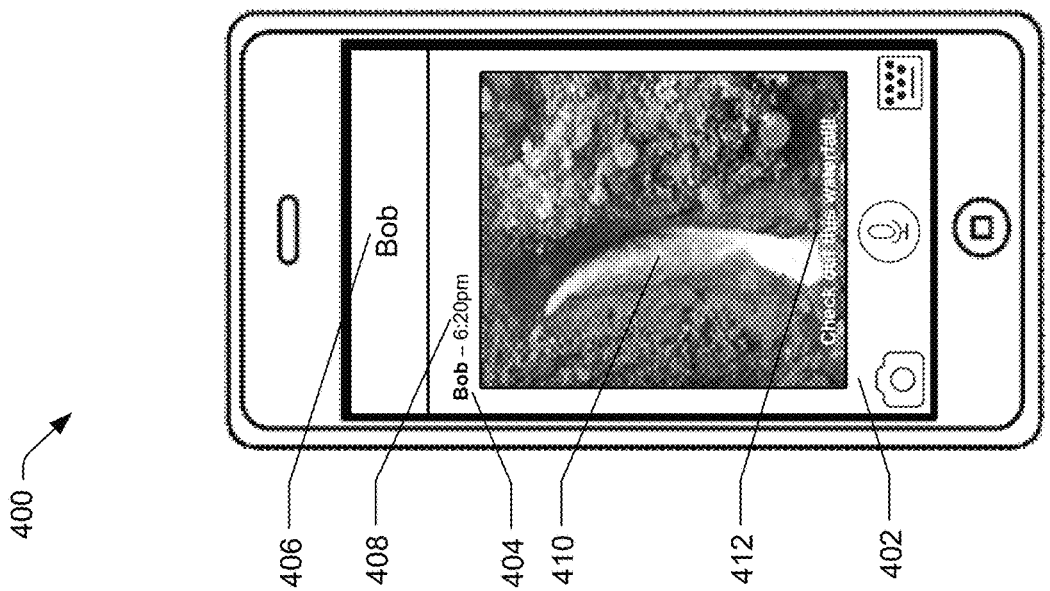
FIG. 4A illustrates an example user interface depicting image message data grouped with textual message data.

FIG. 4A illustrates an example user interface 400 depicting image data grouped with textual message data. The user interface 400 may be displayed, for example, on a mobile device. The user interface 400 may include a messaging window 402, which may display message data that has been sent and/or received by the device. The user interface 400 may also include a name indicator 404, which may provide a user of the device with a visual indication of who the message data being displayed is to and/or from. As shown in FIG. 4A, the name indicator 404 is "Bob." A header 406 of the user interface 400 may also provide an indication of who the message data being displayed is to and/or from. In examples, the header 406 may provide a more detailed indication of who the message data is to and/or from, such as a full name, while the name indicator 404 may provide an abbreviated or incomplete indication, such as a first name and/or nickname. The user interface 400 may also include a time of day 408, which may provide a visual indication of when message data was sent and/or received.

The user interface 400 may also depict a combined message that includes message data from differing media types. For example, as shown in FIG. 4A, first message data 410 includes image data, and second message data 412 includes text data. The first message data 410 and the second message data 412 may have been combined into a single message based at least in part on the one or more factors described herein, such as the first message data 410 and the second message data 412 being received from the same device, user profile, and/or user account. Additionally, or alternatively, the first message data 410 and the second message data 412 may have been combined into the single message based on the second message data 412 being sent and/or received within a threshold amount of time from when the first message data 410 was sent and/or received. Additionally, or alternatively, the first message data 410 and the second message data 412 may have the same or a similar theme.

In examples where at least a portion of the message data from the combined message includes image data and another portion of the message data includes text data, such as shown in FIG. 4A, the image data may be displayed on the user interface 400 with the text data displayed in close proximity to the image data to provide a visual indication that the image data and the text data are part of the same message. For example, the first message 410, which includes image data, may be displayed on the user interface 400. If the first message 410 includes image data corresponding to video, a play icon or other visual indication that the depicted image corresponds to video may be provided. Upon receiving a selection of the play icon by a user of the user interface 400, images corresponding to the image data may be displayed on the user interface 400. If audio data associated with the image data is also present, one or more speakers of the device displaying the user interface 400 may output audio corresponding to the audio data. Additionally, the second message 412, which includes text data, may be displayed on the user interface 400 in close proximity to the first message 410. As shown in FIG. 4A, the text data has been superimposed on the image data. In other examples, the text data may be displayed below the image data, or the text data may be superimposed at various other locations on the image data. The font size, style, and color may be adjusted to allow the user to read the text data. For example, as shown in FIG. 4A, the font color has been adjusted to white because the first message 410 includes a dark area near the bottom of the first message 410. In other examples, the image data may have primarily light colors, which may cause the text data color to be adjusted to a darker color to contrast with the image data. A color analysis of the image data may be performed by a remote server and/or the device to determine a portion of the message to superimpose text data on. The portion of the message may be where a similar color and/or or tone is identified.

FIG. 4B illustrates a user interface 400 depicting image message data grouped with audio message data. The same or similar features from those shown in FIG. 4A may be present in FIG. 4B, such as, for example, a messaging window 402, a name indicator 404, a header 406, a time of day 408, and a first message 410, which may include image data. Additionally, the user interface 400 depicted in FIG. 4B may include second message data that may comprise audio data. A symbol 414 may be displayed to indicate that second message data is present as audio data, and that the second message data is related to the first message data 410. A user may select the symbol 414 by, for example, touching a portion of the screen corresponding to the symbol 414. Upon selecting the symbol 414, one or more speakers of the device displaying the user interface 400 may output audio corresponding to the audio data. The audio may include supplemental information, such as an audible indication of who the message data is from and a time of day that the message data was sent and/or received. In other examples, selection of the image data displayed in the user interface 400 may cause the one or more speakers of the device to output the audio. In other examples, the audio may be output automatically when the image data is displayed on the user interface 400.

While FIG. 4A depicts a combined message that includes image data and text data, and FIG. 4B depicts a combined message that includes image data and audio data, it should be understood that combined messages may include any or all media types. For example, a combined message may include image data as well as audio data and text data. In these examples, the text data may be displayed as shown in FIG. 4A and audio corresponding to the audio data may be output in a manner described with respect to FIG. 4B.

Figure 5:
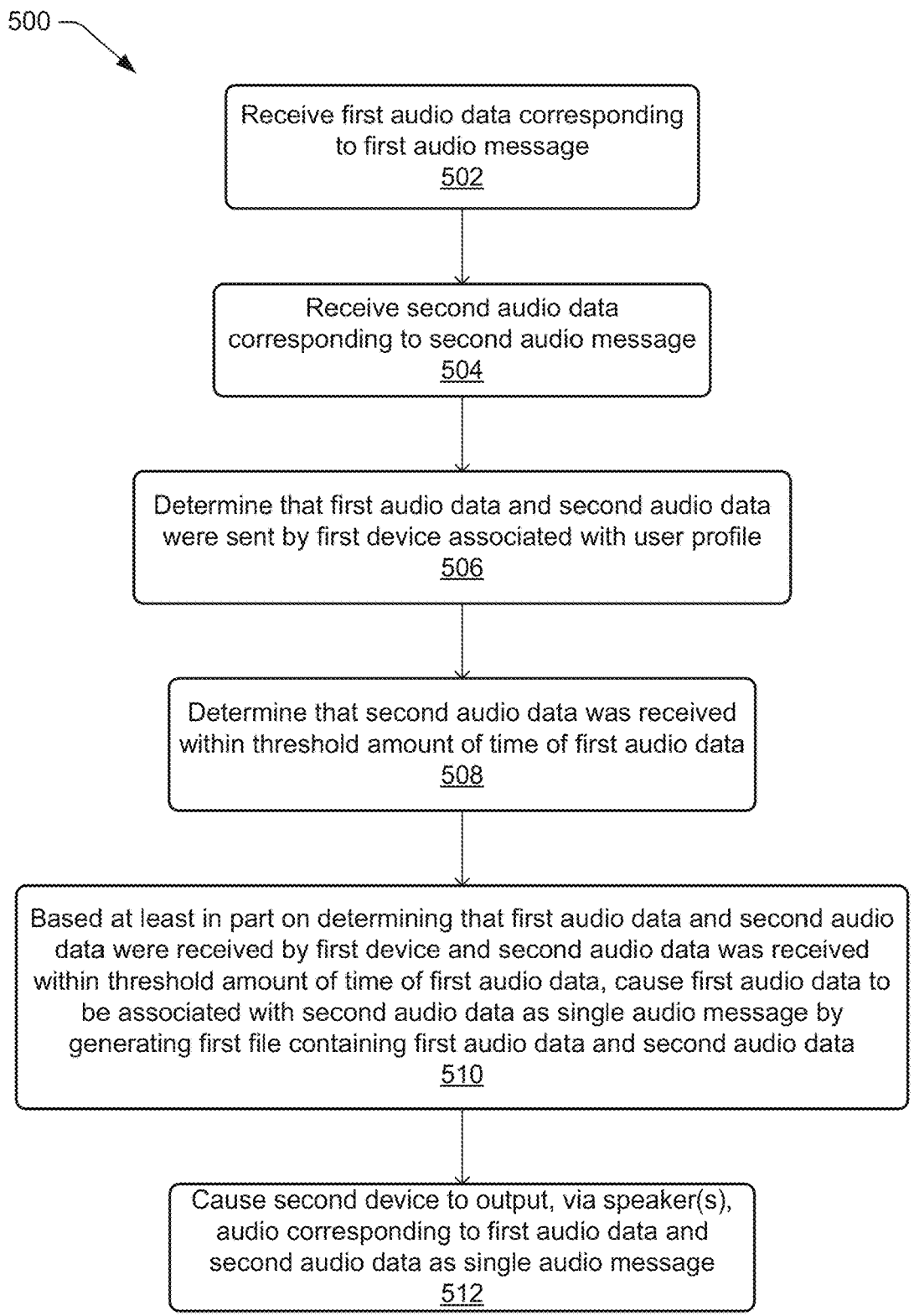
FIG. 5 illustrates a flow diagram of an example process for grouping messages.

FIG. 5 illustrates a flow diagram of an example method 500 for grouping messages. Method 500 is illustrated as a logical flow graph. The order in which the operations or steps are described is not intended to be construed as a limitation, and any number of the described operations may be combined in any order and/or in parallel to implement method 500.

At block 502, the method 500 may include receiving first audio data corresponding to a first audio message. The first audio message may be a message from a first user, user profile, and/or user account that is directed to a second user, user profile, and/or user account. The audio data may be received over a network. The network may represent an array of wired networks, wireless networks, such as WiFi, or combinations thereof. The audio data may be received at, for example, a remote system. In some instances, the remote system may be local to an environment associated with a sending and/or receiving device. In some instances, some or all of the functionality of the remote system may be performed by one or more of the sending or receiving device.

The remote system may include a network interface. The network interface may enable communications between the remote system and sending and receiving devices, as well as other networked devices. Such network interface(s) can include one or more network interface controllers (NICs) or other types of transceiver devices to send and receive communications over a network. The network interface(s) may include a personal area network (PAN) component to enable communications over one or more short-range wireless communication channels. For instance, the PAN component may enable communications compliant with at least one of the following standards IEEE 802.15.4 (ZigBee), IEEE 802.15.1 (Bluetooth), IEEE 802.11 (WiFi), or any other PAN communication protocol. Furthermore, each of the network interface(s) may include a wide area network (WAN) component to enable communication over a wide area network.

At block 504, the method 500 may include receiving second audio data corresponding to a second audio message. The second audio data may be received over the network and via the network interfaces described about.

At block 506, the method 500 may include determining that the first audio data and the second audio data were sent by the same user profile and/or the same device, such as a first device, associated with the user profile. Determining that the first audio data and the second audio data were receiving from the same user profile may be based at least in part on data, such as metadata, from the first audio data and the second audio data that identifies the user profile and/or a device associated with the user profile from which the first audio data and the second audio data was sent.

At block 508, the method 500 may include determining that the second audio data was received within a threshold amount of time of the first audio data. The threshold amount of time may be static or dynamic. For example, when the threshold amount of time is static, the threshold amount of time may be predefined or may be user-configurable. The threshold amount of time may be, for example, a number of seconds, a number of minutes, and/or a number of hours. In other examples where the threshold amount of time is dynamic, the threshold amount of time may differ with respect to the sending and/or receiving device, the sending and/or receiving user profile, the sending and/or receiving user account, and/or historical sending and/or receiving activity. For example, a determination may be made that related messages from a first user are sent relatively close in time to each other, such as a matter of seconds. In this example, the threshold amount of time with respect to the first user may be a matter of seconds, such as, for example, 15 seconds or 30 seconds. In other examples, a determination may be made that a time difference between sending of related messages from a second user is greater than that of the first user, such as, a matter of minutes. In this example, the threshold amount of time with respect to the second user may be a matter of minutes, such as, for example 1 minute, 2 minutes, 5 minutes, 10, minutes, 15 minutes, or 30 minutes. As message sending and/or receiving behavior changes over time, the threshold amount of time may also change proportionally. In examples where at least one message is sent from a voice-assistant device, the voice-assistant device may have a maximum length for a message, but the user may desire to send a message that is longer than the maximum length. In these examples, a determination may be made that the length of the first message corresponds to the maximum message length, and this determination may be used along with the determination that the first message data and the second message data were sent by the same device.

In other examples, the voice-assistant device may determine that a user has stopped speaking a message, and in response thereto the voice-assistant device may determine that the user has concluded his or her message. In some examples, the user may have paused or temporarily stopped speaking, but the speaker also intended to continue speaking. Utilizing the natural language understanding techniques described herein, the remote system and/or sending device may determine that a user has paused and resumed speaking, such as by determining that content of the speech before the pause relates to the content of the speech after the pause. For example, it may be determined that the first message and/or the second message were not complete sentences, but if combined, the first message and the second message represent a complete sentence. In these examples, content of the first and/or second message may be edited. For example, if a user pauses or otherwise does not provide a complete message, the user may start a new message saying "sorry I got cut off, but . . . ." This portion of the new message may be removed from the combined message such that the combined message is displayed and/or output on the receiving device as a single message.

At block 510, the method 500 may include causing the first audio data to be associated with the second audio data as a single audio message based at least in part on one or more of the determinations described above with respect to block 508. Causing the first audio data to be associated with the second audio data may be performed in a number of ways. For example, the first audio data may correspond to a first file and the second audio data may correspond to a second file. The first audio data may be added to the second file or the second audio data may be added to the first file, such that the first audio data and the second audio data are combined into a single file. In these examples, the other file may be deleted. In other examples, a third file may be generated and the first audio data and second audio data may be added to the third file. In these examples, the first file and the second file may be deleted. In other examples, one or more instructions may be generated and associated with the first file and second file. The one or more instructions may be sent with the first file and the second file, and the one or more instructions may instruct processors situated on recipient devices to display and/or output the first audio data and the second audio data together as one message. Combining audio data as described herein may be otherwise described as stitching, merging, and/or linking audio data.

Causing the first audio data to be associated with the second audio data as the single audio message may additionally, or alternatively, be based at least in part on a matching or similar theme of the first audio data and the second audio data. To determine one or more themes of the audio data, first text data representing a first transcription of the first audio data may be generated. Additionally, second text data representing a second transcription of the second audio data may be generated. The text data of the two messages may include similar keywords and/or similar subject matter as determined using natural language understanding techniques described more fully below.

Additional message data may also be associated with the single message data, including message data that includes one or more media types other than audio data. For example, text data may be received and a determination may be made that the text data is associated with at least one of the first audio message or the second audio message based at least in part on the text data being receiving from the same device as the first audio message and/or the second audio message. Additionally, or alternatively, the text data may be associated based at least in part on the text data being sent and/or received within the threshold amount of time from the first audio message and/or the second audio message. Additionally, or alternatively, the text data may be associated based at least in part on a theme of the text data matching and/or being similar to one or more themes associated with at least one of the first message data or the second message data. In some examples, third audio data corresponding to the text data may be generated. The third audio data may comprise synthesized speech corresponding to the text data and/or prerecorded speech, such as from a voice talent. In these examples, the third audio data may be associated with the single message data and audio corresponding to the audio data may be output along with the audio corresponding to the first audio data and the second audio data.

Additional message data may be received at a later time, but may also be included in the single message data based on one or more factors. For example, third audio data may be received that corresponds to a third audio message. The third audio data may be received from the same device, user, user profile, and/or user account as the first audio data and/or the second audio data. Additionally, the third audio data may be received after the threshold amount of time described above with respect to block 508 but within a second threshold amount of time. Based at least in part on the third audio data being received from the same device and with the timing described herein, the third audio data may be associated with the single message data. Additionally, an earmark, such as an audio earmark, may be generated. The audio earmark may indicate that the third audio data was received at a later time with respect to the first audio data and the second audio data. The audio earmark may be, for example, a word or phrase that provides an audible indication that the third audio data was sent and/or received at a later time. In some examples, the audio earmark may be the word "then," which may be output during output of audio corresponding to the single message data after the second audio data and before the third audio data.

At block 512, the method 500 may include causing a second device to output, via one or more speakers of the second device, audio corresponding to the first audio data and the second audio data as the single audio message. The second device may be, for example, a mobile device associated with the recipient of the first audio message and the second audio message. The second device may additionally, or alternatively, be a voice-assistant device that is associated with the recipient and/or a user profile or user account associated with the recipient. Causing the second device to output the single audio message may be in response to a command received by the second device, such as from a user. In response to receiving the command, the second device may send data representing a request to a remote system for messages associated with the recipient and/or the second device. The remote system may receive the data representing the request and may send message data corresponding to messages associated with the recipient and/or the second device. The second device, in response to receiving the message data, may output the message data as described above.

Figure 6:
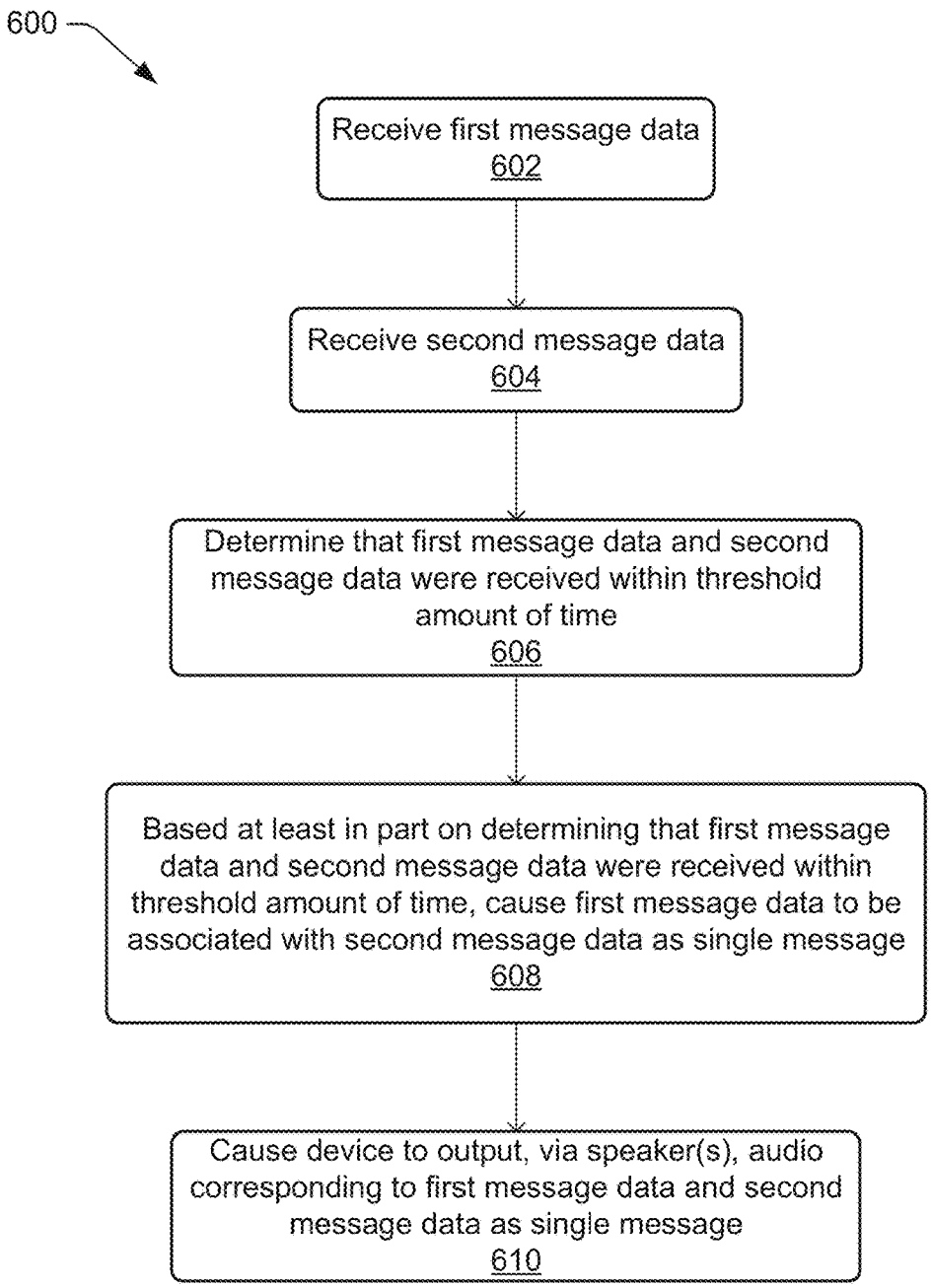
FIG. 6 illustrates a flow diagram of another example process for grouping messages.

FIG. 6 illustrates a flow diagram of an example method 600 for grouping messages. Method 600 is illustrated as a logical flow graph. The order in which the operations or steps are described is not intended to be construed as a limitation, and any number of the described operations may be combined in any order and/or in parallel to implement method 600.

At block 602, the method 600 may include receiving first message data. The first message data may include audio data, text data, and/or image data. The first message data may be a message from a first user, user profile, and/or user account that is directed to a second user, user profile, and/or user account. The first message data may be received over a network. The network may represent an array of wired networks, wireless networks, such as WiFi, or combinations thereof. The audio data may be received at, for example, a remote system. In some instances, the remote system may be local to an environment associated with a sending and/or receiving device. In some instances, some or all of the functionality of the remote system may be performed by one or more of the sending or receiving device.

The remote system may include a network interface. The network interface may enable communications between the remote system and sending and receiving devices, as well as other networked devices. Such network interface(s) can include one or more network interface controllers (NICs) or other types of transceiver devices to send and receive communications over a network. The network interface(s) may include a personal area network (PAN) component to enable communications over one or more short-range wireless communication channels. For instance, the PAN component may enable communications compliant with at least one of the following standards IEEE 802.15.4 (ZigBee), IEEE 802.15.1 (Bluetooth), IEEE 802.11 (WiFi), or any other PAN communication protocol. Furthermore, each of the network interface(s) may include a wide area network (WAN) component to enable communication over a wide area network.

At block 604, the method 600 may include receiving second message data. The second message data may be of the same media type(s) as the second message data, or the media type(s) may differ. The second message data may be sent over the network and via the network interfaces described above with respect to block 602.

At block 606, the method 600 may include determining that the first message data and the second message data were received and/or sent within a threshold amount of time. The threshold amount of time may be static or dynamic. For example, when the threshold amount of time is static, the threshold amount of time may be predefined or may be user-configurable. The threshold amount of time may be, for example, a number of seconds, a number of minutes, and/or a number of hours. In other examples where the threshold amount of time is dynamic, the threshold amount of time may differ with respect to the sending and/or receiving device, the sending and/or receiving user profile, the sending and/or receiving user account, and/or historical sending and/or receiving activity. For example, a determination may be made that related messages from a first user are sent relatively close in time to each other, such as a matter of seconds. In this example, the threshold amount of time with respect to the first user may be a matter of seconds, such as, for example, 15 seconds or 30 seconds. In other examples, a determination may be made that a time difference between sending of related messages from a second user is greater than that of the first user, such as, a matter of minutes. In this example, the threshold amount of time with respect to the second user may be a matter of minutes, such as, for example 1 minute, 2 minutes, 5 minutes, 10, minutes, 15 minutes, or 30 minutes. As message sending and/or receiving behavior changes over time, the threshold amount of time may also change proportionally. In examples where at least one message is sent from a voice-assistant device, the voice-assistant device may have a maximum length for a message, but the user may desire to send a message that is longer than the maximum length. In these examples, a determination may be made that the length of the first message corresponds to the maximum message length, and this determination may be used along with the determination that the first message data and the second message data were sent by the same device.

At block 608, the method 600 may include causing the first message data to be associated with the second message data as a single message. Causing the first message data to be associated with the second message data may be based at least in part on the determination that the first message data and the second message data were received within the threshold amount of time. Additionally, or alternatively, causing the first message data to be associated with the second message data may be based at least in part on a determination that the first message data and the second message data were sent by the same device, such as a first device. A determination may also be made that the first message data and the second message data were received from the same user, the same user profile, and/or the same user account. Determining that the first message data and the second message data were sent by the same device may be based at least in part on data, such as metadata, from the first message data and the second message data that identifies the device from which the first message data and the second message data was sent.

Causing the first message data to be associated with the second message data as the single message may additionally, or alternatively, be based at least in part on a matching or similar theme of the first message data and the second message data. To determine one or more themes of the message data, first text data representing a first transcription of the first message data may be generated in instances where the first message data includes audio data. Additionally, second text data representing a second transcription of the second message data may be generated in stances where the second message data includes audio data. In instances, where the first and/or second message data comprises text data, a transcription may not be necessary. The text data of the two messages may include similar keywords and/or similar subject matter as determined using natural language understanding techniques described more fully below.

Causing the first message data to be associated with the second message data may be performed in a number of ways. For example, the first message data may correspond to a first file and the second message data may correspond to a second file. The first message data may be added to the second file or the second message data may be added to the first file, such that the first message data and the second message data are combined into a single file. In these examples, the other file may be deleted. In other examples, a third file may be generated and the first message data and second message data may be added to the third file. In these examples, the first file and the second file may be deleted. In other examples, one or more instructions may be generated and associated with the first file and second file. The one or more instructions may be sent with the first file and the second file, and the one or more instructions may instruct processors situated on recipient devices to display and/or output the first message data and the second message data together as one message. Combining message data as described herein may be otherwise described as stitching, merging, and/or linking message data.

Causing the first message data to be associated with the second message data may also include normalizing one or more aspects of the first message data and the second message data. For example, when the first message data and/or the second message data includes audio data, the audio data from one message may be at a higher or lower volume range than the other message. Volume data may be generated as part of the first and/or second message data and may be utilized to determine the volume of the first and/or second message. The volume range, and/or other characteristics of the audio data, such as pitch, tone, etc., may be normalized such that, when audio corresponding to the audio data is output, the messages have the same or similar sound characteristics. This may be accomplished by, for example, determining, from first volume data of the first message data, a first volume range associated with first audio data of the first message data. A second volume range associated with second audio data of the second message data may also be determined from second volume data of the second message data. The first volume range and the second volume range may be normalized by, for example, adjusting the first volume range to the second volume range, adjusting the second volume range to the first volume range, or adjusting the first volume range and the second volume range to a third volume range. In other examples, a third volume range may be determined based at least in part on the first volume range and the second volume range, and the first message data and the second message data may be associated with the third volume range. Adjustment of volume ranges as described herein may performed by altering the audio data of a message such that the audio data is attenuated when the volume range is reduced or amplified when the volume range is increased. Likewise, adjustment of tone, pitch, and other aspects of the audio data may be achieved by attenuating and/or amplifying portions of the audio data corresponding to these speech characteristics to match or be similar to the audio data of another message.

Additionally, an earmark, such as an audio earmark, may be generated. The audio earmark may indicate that the second message data was received at a later time with respect to the first message data. The audio earmark may be, for example, a word or phrase that provides an audible indication that the send message data was sent and/or received at a later time. In some examples, the audio earmark may be the word "then," which may be output during output of audio corresponding to the single message data after the first message data and before the first message data.

Additionally, when the first message data and the second message data include differing media types, such as, for example, text messages, audio messages, video messages, pictorial messages, etc., these media types may also be associated. For example, a first message may include image data and a second message may include audio data and/or text data. Based at least in part on at least one of the factors for combining messages as described herein, the first message and the second message may be combined such that, for example, the text data is displayed along with the image data, and/or the audio data is output while the image data is displayed. For example, image data corresponding to video that is received within the threshold amount of time with respect to previous message data may be associated with the single message. The images corresponding to the video data may be displayed, such as on a mobile device with a screen, during output of audio data from the single message and/or during display of text data from the single message.

Additionally, causing the first message data to be associated with the second message data may also include the consolidating and/or removing communication notifications based on the factors for combining messages as described herein. For example, the first message data may include a missed call notification and the second message data may include text data and/or audio data sent from the same device and/or user profile and/or user account that the missed call was sent from. The first message data and the second message data may be combined and the missed call notification may be removed and/or not sent to the receiving device.

At block 610, the method 600 may include causing a device to output, via one or more speakers associated with the device, audio corresponding to the first message data and the second message data as the single message. The device may be, for example, a mobile device associated with the recipient of the first message data and the second message data. The device may additionally, or alternatively, be a voice-assistant device that is associated with the recipient and/or a user profile or user account associated with the recipient. Causing the device to output the single message may be in response to a command received by the device, such as from a user. In response to receiving the command, the device may send data representing a request to a remote system for messages associated with the recipient and/or the device. The remote system may receive the data representing the request and may send message data corresponding to messages associated with the recipient and/or the device. The device, in response to receiving the message data, may output the message data as described above.

Figure 7:
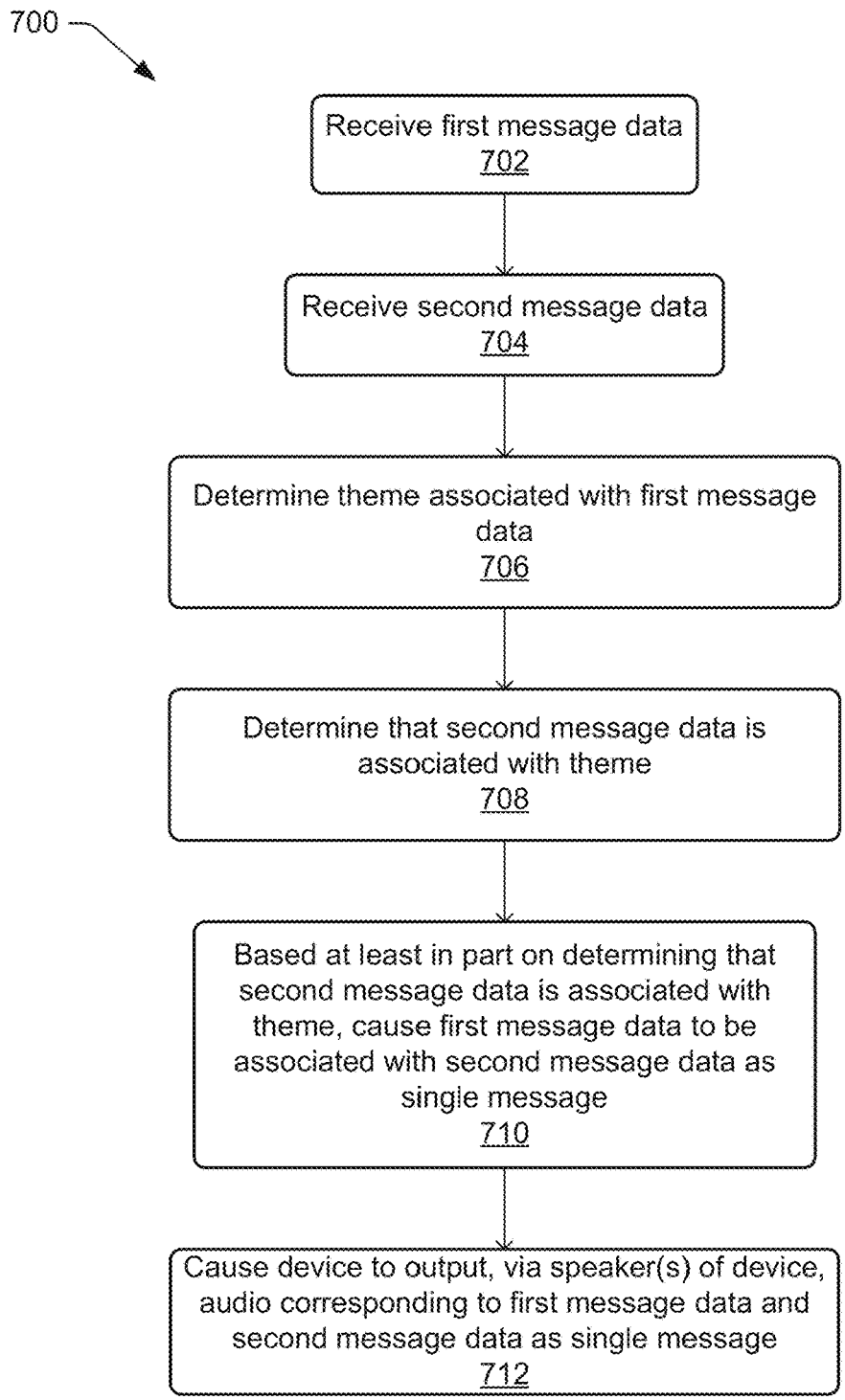
FIG. 7 illustrates a flow diagram of another example process for grouping messages.

FIG. 7 illustrates a flow diagram of an example method 700 for grouping messages. Method 700 is illustrated as a logical flow graph. The order in which the operations or steps are described is not intended to be construed as a limitation, and any number of the described operations may be combined in any order and/or in parallel to implement method 700.

At block 702, the method 700 may include receiving first message data. The first message data may include audio data, text data, and/or image data. The first message data may be a message from a first user, user profile, and/or user account that is directed to a second user, user profile, and/or user account. The first message data may be received over a network. The network may represent an array of wired networks, wireless networks, such as WiFi, or combinations thereof. The audio data may be received at, for example, a remote system. In some instances, the remote system may be local to an environment associated with a sending and/or receiving device. In some instances, some or all of the functionality of the remote system may be performed by one or more of the sending or receiving device.

The remote system may include a network interface. The network interface may enable communications between the remote system and sending and receiving devices, as well as other networked devices. Such network interface(s) can include one or more network interface controllers (NICs) or other types of transceiver devices to send and receive communications over a network. The network interface(s) may include a personal area network (PAN) component to enable communications over one or more short-range wireless communication channels. For instance, the PAN component may enable communications compliant with at least one of the following standards IEEE 802.15.4 (ZigBee), IEEE 802.15.1 (Bluetooth), IEEE 802.11 (WiFi), or any other PAN communication protocol. Furthermore, each of the network interface(s) may include a wide area network (WAN) component to enable communication over a wide area network.

At block 704, the method 700 may include receiving second message data. The second message data may be of the same media type(s) as the second message data, or the media type(s) may differ. The second message data may be sent over the network and via the network interfaces described above with respect to block 702.

At block 706, the method 700 may include determining a theme associated with the first message data. To determine a theme of the first message data, first text data representing a first transcription of the first message data may be generated in instances where the first message data includes audio data. In instances, where the first message data comprises text data, a transcription may not be necessary. The text data of the first message data may include similar keywords and/or similar subject matter as determined using natural language understanding techniques described more fully below. This similar subject matter may be associated with one or more themes of the first message data.

At block 708, the method 700 may include determining that the second message data is associated with the theme. The theme of the second message data may be determined utilizing the techniques described in block 706 above. The theme of the first message data may be associated with the theme of the second message data when, for example, the two themes match or are similar to each other.

At block 710, the method 700 may include causing the first message data to be associated with the second message data as a single message. Causing the first message data to be associated with the second message data may be based at least in part on the determination that the second message data is associated with the theme. Additionally, or alternatively, causing the first message data to be associated with the second message data may be based at least in part on a determination that the first message data and the second message data were received within a threshold amount of time. Additionally, or alternatively, causing the first message data to be associated with the second message data may be based at least in part on a determination that the first message data and the second message data were sent by the same device, such as a first device. A determination may also be made that the first message data and the second message data were received from the same user, the same user profile, and/or the same user account. Determining that the first message data and the second message data were sent by the same device may be based at least in part on data, such as metadata, from the first message data and the second message data that identifies the device from which the first message data and the second message data was sent.

Causing the first message data to be associated with the second message data may be performed in a number of ways. For example, the first message data may correspond to a first file and the second message data may correspond to a second file. The first message data may be added to the second file or the second message data may be added to the first file, such that the first message data and the second message data are combined into a single file. In these examples, the other file may be deleted. In other examples, a third file may be generated and the first message data and second message data may be added to the third file. In these examples, the first file and the second file may be deleted. In other examples, one or more instructions may be generated and associated with the first file and second file. The one or more instructions may be sent with the first file and the second file, and the one or more instructions may instruct processors situated on recipient devices to display and/or output the first message data and the second message data together as one message. Combining message data as described herein may be otherwise described as stitching, merging, and/or linking message data.

Causing the first message data to be associated with the second message data may also include normalizing one or more aspects of the first message data and the second message data. For example, when the first message data and/or the second message data includes audio data, the audio data from one message may be at a higher or lower volume than the other message. The volumes, and/or other characteristics of the audio data, such as pitch, tone, etc., may be normalized such that, when audio corresponding to the audio data is output, the messages have the same or similar sound characteristics. This may be accomplished by, for example, determining a first volume associated with first audio data of the first message data and determining a second volume associated with second audio data of the second message data. The first volume and the second volume may be normalized by, for example, adjusting the first volume to the second volume, adjusting the second volume to the first volume, or adjusting the first volume and the second volume to a third volume.

Additionally, when the first message data and the second message data include differing media types, such as, for example, text messages, audio messages, video messages, pictorial messages, etc., these media types may also be associated. For example, a first message may include image data and a second message may include audio data and/or text data. Based at least in part on at least one of the factors for combining messages as described herein, the first message and the second message may be combined such that, for example, the text data is displayed along with the image data, and/or the audio data is output while the image data is displayed. For example, image data corresponding to video that is received within the threshold amount of time with respect to previous message data may be associated with the single message. The images corresponding to the video may be displayed, such as on a mobile device with a screen, during output of audio data from the single message and/or during display of text data from the single message.

At block 712, the method 700 may include causing a device to output, via one or more speakers of the device, audio corresponding to the first message data and the second message data as the single message. The device may be, for example, a mobile device associated with the recipient of the first message data and the second message data. The device may additionally, or alternatively, be a voice-assistant device that is associated with the recipient and/or a user profile or user account associated with the recipient. Causing the device to output the single message may be in response to a command received by the device, such as from a user. In response to receiving the command, the device may send data representing a request to a remote system for messages associated with the recipient and/or the device. The remote system may receive the data representing the request and may send message data corresponding to messages associated with the recipient and/or the device. The device, in response to receiving the message data, may output the message data as described above.

Figure 8:
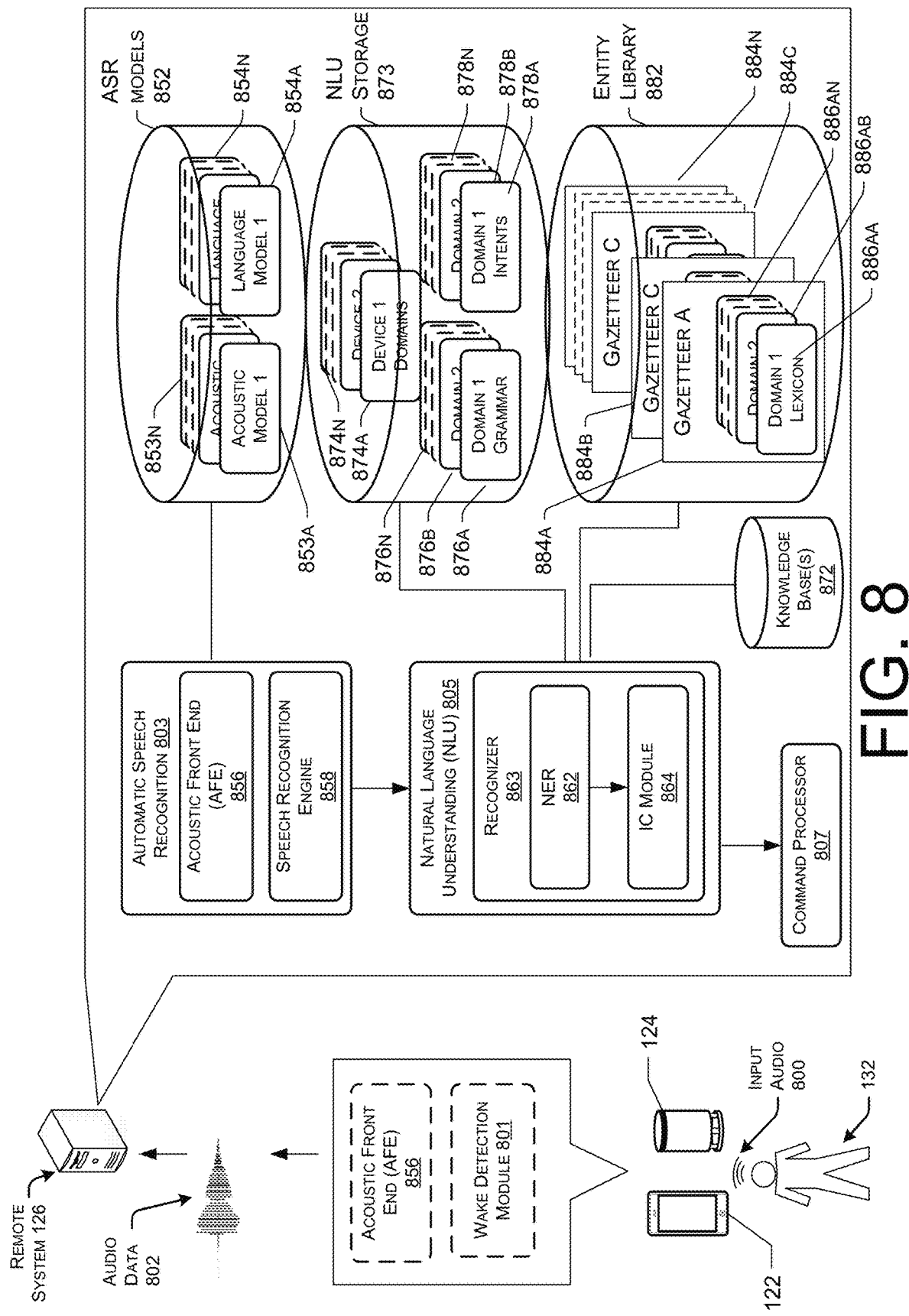
FIG. 8 illustrates a conceptual diagram of components of a speech processing system for processing audio data provided by one or more user devices.

FIG. 8 illustrates a conceptual diagram of how a spoken utterance can be processed, allowing a system to capture and execute commands spoken by a user, such as spoken commands that may follow a wakeword (i.e., a predefined word or phrase for "waking" a device, causing the device to begin sending audio data to a remote system, such as system 126). The various components illustrated may be located on a same or different physical devices. Communication between various components illustrated in FIG. 8 may occur directly or across a network 128. An audio capture component, such as a microphone of the device 122, the device 124, or another device, captures audio 800 corresponding to a spoken utterance. The device 122 or 124, using a wakeword detection module 801, then processes audio data corresponding to the audio 800 to determine if a keyword (such as a wakeword) is detected in the audio data. Following detection of a wakeword, the device sends audio data 802 corresponding to the utterance to the remote system 126 that includes an ASR module 803. The audio data 802 may be output from an optional acoustic front end (AFE) 856 located on the device prior to transmission. In other instances, the audio data 802 may be in a different form for processing by a remote AFE 856, such as the AFE 856 located with the ASR module 803 of the remote system 126.

The wakeword detection module 801 works in conjunction with other components of the user device, for example a microphone to detect keywords in audio 800. For example, the device may convert audio 800 into audio data, and process the audio data with the wakeword detection module 801 to determine whether speech is detected, and if so, if the audio data comprising speech matches an audio signature and/or model corresponding to a particular keyword.

The user device may use various techniques to determine whether audio data includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the user device may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by user device (or separately from speech detection), the user device may use the wakeword detection module 801 to perform wakeword detection to determine when a user intends to speak a command to the user device. This process may also be referred to as keyword detection, with the wakeword being a specific example of a keyword. Specifically, keyword detection may be performed without performing linguistic analysis, textual analysis or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the wakeword detection module 801 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment, the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 124 may "wake" and begin transmitting audio data 802 corresponding to input audio 800 to the remote system 126 for speech processing. Audio data corresponding to that audio may be sent to remote system 126 for routing to a recipient device or may be sent to the remote system 126 for speech processing for interpretation of the included speech (either for purposes of enabling voice-communications and/or for purposes of executing a command in the speech). The audio data 802 may include data corresponding to the wakeword, or the portion of the audio data corresponding to the wakeword may be removed by the local device 124 prior to sending. Further, a local device may "wake" upon detection of speech/spoken audio above a threshold, as described herein. Upon receipt by the remote system 126, an ASR module 803 may convert the audio data 802 into text. The ASR transcribes audio data into text data representing the words of the speech contained in the audio data 802. The text data may then be used by other components for various purposes, such as executing system commands, inputting data, etc. A spoken utterance in the audio data is input to a processor configured to perform ASR which then interprets the utterance based on the similarity between the utterance and pre-established language models 854 stored in an ASR model knowledge base (ASR Models Storage 852). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 853 stored in an ASR Models Storage 852), and the likelihood that a particular word which matches the sounds would be included in the sentence at the specific location (e.g., using a language or grammar model). Thus, each potential textual interpretation of the spoken utterance (hypothesis) is associated with a confidence score. Based on the considered factors and the assigned confidence score, the ASR process 803 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 856 and a speech recognition engine 858. The acoustic front end (AFE) 856 transforms the audio data from the microphone into data for processing by the speech recognition engine 858. The speech recognition engine 858 compares the speech recognition data with acoustic models 853, language models 854, and other data models and information for recognizing the speech conveyed in the audio data. The AFE 856 may reduce noise in the audio data and divide the digitized audio data into frames representing a time intervals for which the AFE 856 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 858 may process the output from the AFE 856 with reference to information stored in speech/model storage (852). Alternatively, post front-end processed data (such as feature vectors) may be received by the device executing ASR processing from another source besides the internal AFE. For example, the user device may process audio data into feature vectors (for example using an on-device AFE 856) and transmit that information to a server across a network for ASR processing. Feature vectors may arrive at the remote system 126 encoded, in which case they may be decoded prior to processing by the processor executing the speech recognition engine 858.

The speech recognition engine 858 attempts to match received feature vectors to language phonemes and words as known in the stored acoustic models 853 and language models 854. The speech recognition engine 858 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc.

The speech recognition engine 858 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 858 to other processing components, which may be local to the device performing ASR and/or distributed across the network(s). For example, ASR results in the form of a single textual representation of the speech, an N-best list including multiple hypotheses and respective scores, lattice, etc. may be sent to the remote system 126, for natural language understanding (NLU) processing, such as conversion of the text into commands for execution, either by the user device, by the remote system 126, or by another device (such as a server running a specific application like a search engine, etc.).

The device performing NLU processing 805 (e.g., server 126) may include various components, including potentially dedicated processor(s), memory, storage, etc. As shown in FIG. 8, an NLU component 805 may include a recognizer 863 that includes a named entity recognition (NER) module 862 which is used to identify portions of query text that correspond to a named entity that may be recognizable by the system. A downstream process called named entity resolution links a text portion to a specific entity known to the system. To perform named entity resolution, the system may utilize gazetteer information (884a-884n) stored in entity library storage 882. The gazetteer information may be used for entity resolution, for example matching ASR results with different entities (such as song titles, contact names, etc.) Gazetteers may be linked to users (for example a particular gazetteer may be associated with a specific user's music collection), may be linked to certain domains (such as shopping), or may be organized in a variety of other ways.

Generally, the NLU process takes textual input (such as processed from ASR 803 based on the utterance input audio 800) and attempts to make a semantic interpretation of the text. That is, the NLU process determines the meaning behind the text based on the individual words and then implements that meaning. NLU processing 805 interprets a text string to derive an intent or a desired action from the user as well as the pertinent pieces of information in the text that allow a device (e.g., device 124) to complete that action. For example, if a spoken utterance is processed using ASR 803 and outputs the text "send a message to Joe: Hi Joe, Congratulations . . . ." the NLU process may determine that the user intended that the user device capture speech of the user for sending, as an audio file, for output on a device of "Joe."

The NLU may process several textual inputs related to the same utterance. For example, if the ASR 803 outputs N text segments (as part of an N-best list), the NLU may process all N outputs to obtain NLU results.

As will be discussed further below, the NLU process may be configured to parsed and tagged to annotate text as part of NLU processing. For example, for the text "Send a message to Joe," "send a message" may be tagged as a command (to generate an audio file and send it for output) and "to Joe" may be tagged as a specific entity associated with the command.

To correctly perform NLU processing of speech input, an NLU process 805 may be configured to determine a "domain" of the utterance so as to determine and narrow down which services offered by the endpoint device (e.g., remote system 126 or the user device) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) module 862 receives a query in the form of ASR results and attempts to identify relevant grammars and lexical information that may be used to construe meaning. To do so, the NLU module 805 may begin by identifying potential domains that may relate to the received query. The NLU storage 873 includes a database of devices (874a-874n) identifying domains associated with specific devices. For example, the user device may be associated with domains for music, telephony, calendaring, contact lists, and device-specific communications, but not video. In addition, the entity library may include database entries about specific services on a specific device, either indexed by Device ID, User ID, or Household ID, or some other indicator.

In NLU processing, a domain may represent a discrete set of activities having a common theme, such as "shopping," "music," "calendaring," etc. As such, each domain may be associated with a particular recognizer 863, language model and/or grammar database (876a-876n), a particular set of intents/actions (878a-878n), and a particular personalized lexicon (886). Each gazetteer (884a-884n) may include domain-indexed lexical information associated with a particular user and/or device. For example, the Gazetteer A (884a) includes domain-index lexical information 886aa to 886an. A user's contact-list lexical information might include the names of contacts. Since every user's contact list is presumably different, this personalized information improves entity resolution.

As noted above, in traditional NLU processing, a query may be processed applying the rules, models, and information applicable to each identified domain. For example, if a query potentially implicates both communications and, for example, music, the query may, substantially in parallel, be NLU processed using the grammar models and lexical information for communications, and will be processed using the grammar models and lexical information for music. The responses based on the query produced by each set of models is scored, with the overall highest ranked result from all applied domains is ordinarily selected to be the correct result.

An intent classification (IC) module 864 parses the query to determine an intent or intents for each identified domain, where the intent corresponds to the action to be performed that is responsive to the query. Each domain is associated with a database (878a-878n) of words linked to intents. For example, a music intent database may link words and phrases such as "quiet," "volume off," and "mute" to a "mute" intent. A voice-message intent database, meanwhile, may link words and phrases such as "send a message," "send a voice message," "send the following," or the like. The IC module 864 identifies potential intents for each identified domain by comparing words in the query to the words and phrases in the intents database 878. In some instances, the determination of an intent by the IC module 864 is performed using a set of rules or templates that are processed against the incoming text to identify a matching intent.

In order to generate a particular interpreted response, the NER 862 applies the grammar models and lexical information associated with the respective domain to actually recognize a mention one or more entities in the text of the query. In this manner, the NER 862 identifies "slots" (i.e., particular words in query text) that may be needed for later command processing. Depending on the complexity of the NER 862, it may also label each slot with a type of varying levels of specificity (such as noun, place, city, artist name, song name, or the like). Each grammar model 876 includes the names of entities (i.e., nouns) commonly found in speech about the particular domain (i.e., generic terms), whereas the lexical information 886 from the gazetteer 884 is personalized to the user(s) and/or the device. For instance, a grammar model associated with the shopping domain may include a database of words commonly used when people discuss shopping.

The intents identified by the IC module 864 are linked to domain-specific grammar frameworks (included in 876) with "slots" or "fields" to be filled. Each slot/field corresponds to a portion of the query text that the system believes corresponds to an entity. To make resolution more flexible, these frameworks would ordinarily not be structured as sentences, but rather based on associating slots with grammatical tags. For example, if "send a message" is an identified intent, a grammar (876) framework or frameworks may correspond to sentence structures such as "Send a message to {contact}," "Send a voice message to {contact}," "Send the following to {contact}," etc.

For example, the NER module 862 may parse the query to identify words as subject, object, verb, preposition, etc., based on grammar rules and/or models, prior to recognizing named entities. The identified verb may be used by the IC module 864 to identify intent, which is then used by the NER module 862 to identify frameworks. A framework for the intent of "send a message," meanwhile, may specify a list of slots/fields applicable to play the identified "contact" and any object modifier (e.g., specifying a device of the recipient) or the like. The NER module 862 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazette for similarity with the framework slots. If the search of the gazetteer does not resolve the slot/field using gazetteer information, the NER module 862 may search the database of generic words associated with the domain (in the knowledge base 872). So, for instance, if the query was "send message to Joe," after failing to determine a last name for "Joe," the NER component 862 may search the domain vocabulary for the word "Joe." In the alternative, generic words may be checked before the gazetteer information, or both may be tried, potentially producing two different results.

The output data from the NLU processing (which may include tagged text, commands, etc.) may then be sent to a command processor 807. The destination command processor 807 may be determined based on the NLU output. For example, if the NLU output includes a command to send a message, the destination command processor 807 may be a message sending application, such as one located on the user device or in a message sending appliance, configured to execute a message sending command. If the NLU output includes a search request, the destination command processor 807 may include a search engine processor, such as one located on a search server, configured to execute a search command.

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component 805 during runtime operations where NLU operations are performed on text (such as text output from an ASR component 803). Each domain may have specially configured components to perform various steps of the NLU operations.

For example, in a NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 863. Each recognizer may include various NLU components such as an NER component 862, IC module 864 and other components such as an entity resolver, or other components.

For example, a messaging domain recognizer 863-A (Domain A) may have an NER component 862-A that identifies what slots (i.e., portions of input text) may correspond to particular words relevant to that domain. The words may correspond to entities such as (for the messaging domain) a recipient. An NER component 862 may use a machine learning model, such as a domain specific conditional random field (CRF) to both identify the portions corresponding to an entity as well as identify what type of entity corresponds to the text portion. The messaging domain recognizer 863-A may also have its own intent classification (IC) component 864-A that determines the intent of the text assuming that the text is within the proscribed domain. An IC component may use a model, such as a domain specific maximum entropy classifier to identify the intent of the text, where the intent is the action the user desires the system to perform. For this purpose, the remote system computing device 126 may include a model training component. The model training component may be used to train the classifier(s)/machine learning models discussed above.

As noted above, multiple devices may be employed in a single speech processing system. In such a multi-device system, each of the devices may include different components for performing different aspects of the speech processing. The multiple devices may include overlapping components. The components of the user device and the remote system 126, as illustrated herein are exemplary, and may be located in a stand-alone device or may be included, in whole or in part, as a component of a larger device or system, may be distributed across a network or multiple devices connected by a network, etc.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
   receiving first message data representing a first communication sent from a first user profile and to a second user profile;
   receiving second message data representing a second communication sent from the first user profile and to the second user profile;

determining that the second message data is received at a first time after the first message data was received;
generating a single audio message that includes the first message data and the second message data based at least in part on:
the second message data being received at the first time; and
the first message data and the second message data being sent from the first user profile;
causing image data to be associated with the single audio message based at least in part on determining that the image data was received within a threshold amount of time with respect to at least one of the first message data or the second message data; and
generating a command configured to cause:
output, utilizing the single audio message and via a speaker, of audio including the first message data and the second message data as the single audio message; and
display of an image corresponding to the image data during output of the single audio message.

2. The method of claim 1, wherein the first message data comprises first audio data, the second message data comprises second audio data, and further comprising:
receiving an indication that the first audio data has a maximum timing length; and
wherein generating the single audio message is based at least in part on the indication that the first audio data has the maximum timing length.

3. The method of claim 1, wherein the first message data comprises first audio data, the second message data comprises second audio data, and further comprising:
determining a first volume range associated with the first audio data;
determining a second volume range associated with the second audio data; and
normalizing the first volume range and the second volume range such that:
a third volume range is determined based at least in part on the first volume range and the second volume range; and
the first message data and the second message data are associated with the third volume range.

4. The method of claim 1, further comprising:
receiving third message data;
determining that the third message data was received after a threshold amount of time has lapsed since receiving the second message data;
causing the third message data to be associated with the single audio message;
generating audio data indicating that the third message data was received at a later time with respect to the first message data and the second message data based at least in part on the third message data being received after the threshold amount of time has lapsed; and
wherein causing output of the audio corresponding to the single audio message comprises causing output of the audio data between the second message data and the third message data.

5. The method of claim 1, wherein the device comprises a first device, and further comprising:
receiving an indication that a call was missed from a second device;
determining that at least one of the first message data or the second message data was received from the second device; and
refraining from sending, to the first device, a notification that the call was missed based at least in part on the determining that the at least one of the first message data or the second message data was received from the second device.

6. The method of claim 1, wherein generating the single audio message comprises at least one of:
generating an instruction to output the first message data and the second message data together; or
causing the first message data to be incorporated into a file containing the second message data.

7. A system comprising:
one or more processors; and
non-transitory computer-readable media storing computer-executable instructions that, when executed by the one or more processors, cause the one or more processors to perform operations comprising:
receiving first message data representing a first communication from a first profile and to a device;
receiving second message data representing a second communication from the first profile and to the device;
determining that the second message data is received at a first time from when the first message data was received;
generating a single audio message including the first message data and the second message data based at least in part on:
the second message data being received at the first time; and
the first message data and the second message data being received from the first profile;
causing image data to be associated with the single audio message based at least in part on determining that the image data was received within a threshold amount of time with respect to at least one of the first message data or the second message data; and
generating a command configured to cause:
output, utilizing the single audio message and via a speaker, of audio including the first message data and the second message data as the single audio message; and
display of an image corresponding to the image data during output of the single audio message.

8. The system of claim 7, wherein the first message data comprises first audio data, the second message data comprises second audio data, and the operations further comprise:
determining a first volume range associated with the first audio data;
determining a second volume range associated with the second audio data; and
normalizing the first volume and the second volume such that:
a third volume range is determined based at least in part on the first volume range and the second volume range; and
the first message data and the second message data are associated with the third volume range.

9. The system of claim 7, wherein generating the single audio message is based at least in part on an indication that the first message data and the second message data are received from the same device.

10. The system of claim 7, wherein the device comprises a first device, first message data is received from a second device, and the second message data is received from a third device.

11. The system of claim 7, the operations further comprising:
- determining that the first message data is associated with a theme;
- determining that the second message data is associated with the theme;
- receiving image data;
- determining that the image data is associated with the theme;
- causing the image data to be associated with the single audio message based at least in part on the determining that the image data is associated with the theme; and
- causing display of an image corresponding to the image data during output of the single audio message by the speaker.

12. The system of claim 7, wherein at least one of the first message data or the second message data comprises audio data.

13. The system of claim 7, wherein generating the single audio message comprises generating an instruction to output the audio corresponding to the first message data and the second message data together.

14. The system of claim 7, the operations further comprising causing, based at least in part on the second message data being received at the first time, display of a first identifier of the single audio message in place of a second identifier of the first message data and a third identifier of the second message data.

15. The system of claim 7, the operations further comprising:
- determining, based at least in part on the second message data being received at the first time, to refrain from sending a first notification associated with the first message data and a second notification associated with the second message data; and
- sending a third notification associated with the single audio message.

16. The system of claim 7, the operations further comprising causing a notification of the single audio message to be output, the notification indicating that a single message, instead of two messages associated with the first message data and the second message data, has been received.

17. A system comprising:
- one or more processors; and
- non-transitory computer-readable media storing computer-executable instructions that, when executed by the one or more processors, cause the one or more processors to perform operations comprising:
  - receiving first message data from a first profile and directed to a device;
  - receiving second message data from the first profile and directed to the device;
  - determining that the second message data is received within a threshold amount of time from when the first message data was received;
  - replacing the first message data and the second message data with a single audio message that includes the first message data and the second message data based at least in part on:
    - the second message data being received within the threshold amount of time; and
    - the first message data and the second message data being received from the first profile;
  - causing image data to be associated with the single audio message based at least in part on determining that the image data was received within the threshold amount of time with respect to at least one of the first message data or the second message data; and
  - generating a command configured to cause:
    - output of audio corresponding to the single audio message instead of the first message data and the second message data; and
    - display of an image corresponding to the image data during output of the single audio message.

* * * * *